United States Patent
Tada et al.

(10) Patent No.: US 9,845,828 B2
(45) Date of Patent: Dec. 19, 2017

(54) GUIDE MECHANISM OF MACHINE TOOL AND MACHINE TOOL

(71) Applicant: Toshiba Kikai Kabushiki Kaisha, Chiyoda-ku, Tokyo (JP)

(72) Inventors: Atsushi Tada, Numazu (JP); Makoto Sagara, Shizuoka (JP); Teruaki Tsukiji, Gotemba (JP); Takao Arai, Uji (JP); Kazuhiro Takeuchi, Numazu (JP); Shun Tsunoda, Numazu (JP); Masato Inatsu, Gotemba (JP); Yusuke Ishii, Gotemba (JP); Yuya Tanaka, Gotemba (JP)

(73) Assignee: TOSHIBA KIKAI KABUSHIKI KAISHA, Chiyoda-Ku, Tokyo (JP)

( * ) Notice: Subject to any disclaimer, the term of this patent is extended or adjusted under 35 U.S.C. 154(b) by 31 days.

(21) Appl. No.: 14/924,338

(22) Filed: Oct. 27, 2015

(65) Prior Publication Data
US 2016/0115993 A1    Apr. 28, 2016

(30) Foreign Application Priority Data

Oct. 28, 2014   (JP) .................................. 2014-219652
Apr. 23, 2015   (JP) .................................. 2015-088198

(51) Int. Cl.
*F16C 29/02* (2006.01)
*B23Q 1/38* (2006.01)
(Continued)

(52) U.S. Cl.
CPC .............. *F16C 29/025* (2013.01); *B23Q 1/38* (2013.01); *B23Q 1/56* (2013.01); *B23Q 1/70* (2013.01);
(Continued)

(58) Field of Classification Search
CPC   F16C 29/025; F16C 2322/39; F16C 32/0651; F16C 32/0662; F16C 33/741;
(Continued)

(56) References Cited

U.S. PATENT DOCUMENTS 3,355,990 A    12/1967   Thum
3,754,799 A *   8/1973   Hedberg ............. F16C 32/0651
                                                     384/114
(Continued)

FOREIGN PATENT DOCUMENTS

CN         2082655        8/1991
CN       201082504        7/2008
(Continued)

OTHER PUBLICATIONS

English Language Abstract and Machine Translation of JP 2008-238397 published Oct. 9, 2008.
(Continued)

*Primary Examiner* — Marcus Charles
(74) *Attorney, Agent, or Firm* — DLA Piper LLP US

(57) ABSTRACT

A guide mechanism for a machine tool includes a movement member and a guide member in a form of first and second rails the movement member and the guide member relatively movable to each other. A hydrostatic pressure guide mechanism and a sliding guide mechanism are formed between the movement member and the first and second rails. The hydrostatic pressure guide mechanism includes a static pressure chamber, a seal portion sealing a periphery of the static pressure chamber, and a supply passage configured to supply a lubricating oil into the static pressure chamber.

9 Claims, 14 Drawing Sheets

(51) Int. Cl.
*B23Q 1/56* (2006.01)
*B23Q 1/70* (2006.01)
*F16C 33/74* (2006.01)

(52) U.S. Cl.
CPC ........ *F16C 33/741* (2013.01); *F16C 2322/39* (2013.01)

(58) Field of Classification Search
CPC ......... F16C 32/0659; B23Q 1/56; B23Q 1/38; B23Q 11/24; B23Q 11/124; B23Q 1/70
USPC ............ 384/12–13, 15, 26, 94–95, 129–130; 251/53; 376/235
See application file for complete search history.

(56) References Cited

U.S. PATENT DOCUMENTS

| | | | | |
|---|---|---|---|---|
| 4,465,325 A | * | 8/1984 | Faure | F16C 29/025 376/252 |
| 4,523,410 A | * | 6/1985 | Yoshioka | B23Q 1/38 384/13 |
| 4,653,408 A | * | 3/1987 | Nagashima | B23Q 1/385 108/143 |
| 4,865,465 A | * | 9/1989 | Sugita | B23Q 1/38 384/12 |
| 5,104,237 A | * | 4/1992 | Slocum | F16C 29/025 29/898.02 |
| 5,488,771 A | * | 2/1996 | Devitt | B23Q 1/26 29/460 |
| 6,276,491 B1 | * | 8/2001 | Schonfeld | F16C 29/025 137/501 |
| 6,749,378 B2 | * | 6/2004 | Saito | B23Q 1/017 409/135 |
| 7,134,668 B2 | * | 11/2006 | Shinozaki | F16C 29/025 277/431 |
| 7,232,257 B2 | * | 6/2007 | Sai | F16C 29/025 384/12 |
| 7,287,906 B2 | * | 10/2007 | Wasson | F16C 29/008 384/12 |
| 7,845,853 B2 | * | 12/2010 | Rudy | F16C 29/005 384/12 |

FOREIGN PATENT DOCUMENTS

| | | | | |
|---|---|---|---|---|
| CN | 202752835 | | 2/2013 | |
| CN | 203304897 | | 11/2013 | |
| DE | 2901064 A1 | * | 8/1980 | ............. F16C 13/04 |
| DE | EP-1820601 A2 | * | 8/2007 | ............. B23Q 1/70 |
| GB | 1073442 A | * | 6/1967 | ............. B23Q 1/38 |
| GB | 1346001 A | * | 2/1974 | ............. B23Q 1/38 |
| JP | 2004-058192 | | 2/2004 | |
| JP | 2008-238397 | | 10/2008 | |
| JP | 2011-158018 | | 8/2011 | |
| JP | EP-2740953 A1 | * | 6/2014 | ............. F16F 9/103 |
| WO | WO-2004020852 A1 | * | 3/2004 | ............. F16C 29/008 |

OTHER PUBLICATIONS

English Language Abstract and Machine Translation of JP 2004-058192 published Feb. 26, 2004.
Chinese Office Action (with English Language Translation) issued in Chinese Application No. 201510706546.3 dated May 27, 2017.
English Language Abstract of JP 2011-158018 published Aug. 18, 2011.
English Language Abstract of CN 202752835 published Feb. 27, 2013.
English Language Abstract of CN 201082504 published Jul. 9, 2008, 2004.
English Language Abstract of CN 2082655 published Aug. 14, 1991.
English Language Abstract of CN 203304897 published Nov. 27, 2013.

* cited by examiner

GUIDE MECHANISM OF MACHINE TOOL AND MACHINE TOOL

CROSS-REFERENCE TO RELATED APPLICATIONS

The entire disclosure of Japanese Patent Applications No. 2014-219652 filed Oct. 28, 2014 and No. 2015-088198 filed Apr. 23, 2015 is expressly incorporated by reference herein.

TECHNICAL FIELD

The present invention relates to a guide mechanism for a machine tool and a machine tool provided with the guide mechanism.

BACKGROUND

Typically, various movement mechanisms are used in the machine tool in order to move a workpiece (an object to be machined) and a tool for machining the workpiece to any relative positions.

For instance, linear movement mechanisms are respectively provided in X axis, Y axis and Z axis to a support structure of a table on which the workpiece is placed or a support structure of a head to which the tool is attached in order to move the workpiece and/or the tool in three dimensions. Moreover, a rotary movement mechanism is used for changing a posture of the table and/or the head.

Each of the movement mechanisms includes: two relatively movable members (e.g., a guide member and a movement member movable along the guide member); a drive mechanism for moving the two members; and a guide mechanism for securing accuracy (guiding accuracy) of a moving direction or a movement axis.

Such a guide mechanism is required to have a high guiding accuracy, in other words, a geometrical accuracy showing that a linear movement is conducted in a line as straight as possible and a rotational movement is conducted in a circle as perfect as possible. Further, the guide mechanism is required to have a high load capacity, a low friction and a high damping performance (vibration absorption performance)

Recently, a hydrostatic pressure guide mechanism is used in the guide mechanism for the machine tool (Patent Literature 1: JP-A-2004-58192).

In the hydrostatic pressure guide mechanism, a static pressure chamber is formed on one of a pair of slide surfaces. A lubricating oil is supplied into the static pressure chamber, whereby a load is transmitted by the static pressure to the other of the slide surfaces. In other words, only the lubricating oil intervenes between the pair of slide surfaces, so that the pair of slide surfaces are in non-contact with each other, thereby significantly reducing the slide resistance.

On the other hand, a traditional sliding guide mechanism (dynamic pressure guide mechanism) is often used as the guide mechanism for the machine tool (Patent Literature 2: JP-A-2008-238397).

The sliding guide mechanism is configured to slide a pair of smooth slide surfaces while supplying a lubricating oil therebetween. The pair of slide surfaces are kept in solid contact with each other while being lubricated with a lubricating oil.

Since an oil film, irrespective of the still or moving oil film, constantly intervenes in the above-described hydrostatic pressure guide mechanism, a high load can be supported and a low friction can be stably achieved.

However, since the hydrostatic pressure guide mechanism is configured to float an object using the oil film, a damping performance of the hydrostatic pressure guide mechanism is limitative. Moreover, the hydrostatic pressure guide mechanism requires a supply device for supplying the lubricating oil for forming the oil film and a recovery device for recovering the lubricating oil. Especially, a typical hydrostatic pressure guide mechanism using the lubricating oil cannot discharge the lubricating oil to the outside unlike an air static pressure bearing using air. Accordingly, the lubricating oil supplied to a static pressure chamber is discharged from an outer circumferential edge to the outside of the guide mechanism. Particularly, since a huge amount of the lubricating oil is discharged in the hydrostatic pressure guide mechanism as compared with the sliding guide, the recovery device for recovering the lubricating oil and returning the lubricating oil to the supply device is required. Accordingly, arrangements of devices and pipes associated with the guide mechanism are complicated.

On the other hand, since the sliding guide mechanism provides a sliding guide between the pair of slide surfaces, a guiding accuracy and the damping performance can be improved and the structure is simple. However, in the sliding guide mechanism, since a load capacity is small and a friction coefficient is large, particularly, a friction coefficient is increased when the sliding guide mechanism is started and/or driven at a low speed, motion occasionally becomes unsmooth to affect a positioning accuracy.

In order to smooth the motion of the machine tool, it is conceivable to replace a typical sliding guide mechanism with a hydrostatic pressure guide mechanism excellent in a low friction performance as the guide mechanism.

However, even if a typical sliding guide mechanism is simply replaced by the hydrostatic pressure guide mechanism, a desired performance may fail to be obtained because of the above-described difference in characteristics.

Alternatively, it is conceivable to use a typical sliding guide mechanism and the hydrostatic pressure guide mechanism in combination.

However, a typical hydrostatic pressure guide mechanism is configured such that the lubricating oil supplied to a static pressure chamber is discharged from an outer circumferential edge to the outside of a slide structure.

Accordingly, when the sliding guide mechanism and the hydrostatic pressure guide mechanism are used in combination, the lubricating oil discharged to the outside is likely to be unrecovered and overflow. The overflowing lubricating oil is likely to reach the sliding guide mechanism to adversely influence the sliding guide mechanism.

SUMMARY OF THE INVENTION

An object of the invention is to provide a guide mechanism for a machine tool, having a high load capacity, a low friction, a high guiding accuracy and a high damping performance, and a machine tool using the guide mechanism.

Prior to the invention, the inventors developed a hermetically-closed hydrostatic pressure guide mechanism in which a lubrication oil does not overflow to the outside.

In the hermetically-closed hydrostatic pressure guide mechanism, a periphery of a hydrostatic structure is hermetically closed and the lubricating oil, which is typically discharged from the periphery to the outside, is all recovered and circulated. Accordingly, though the hermetically-closed hydrostatic pressure guide mechanism is a hydrostatic pressure guide mechanism, the hermetically-closed hydrostatic pressure guide mechanism can prevent the lubrication oil from overflowing to the outside.

The invention enables to combine the sliding guide mechanism with the above hydrostatic pressure guide mechanism, so that the respective characteristics of the sliding guide mechanism and the hydrostatic pressure guide mechanism are combined to achieve a guide mechanism, which is used for a machine tool, having a high load capacity, a low friction, a high guiding accuracy and a high damping performance.

Specifically, the guide mechanism for a machine tool of the invention is configured as follows.

According to an aspect of the invention, a guide mechanism for a machine tool includes: a first member and a second member relatively movable to each other; and a hydrostatic pressure guide mechanism and a sliding guide mechanism formed between the first and second members, in which the hydrostatic pressure guide mechanism includes: a static pressure chamber having a sealed periphery; and a supply passage configured to supply a lubricating oil into the static pressure chamber.

In the above aspect of the invention, the hydrostatic pressure guide mechanism may include a recovery passage configured to recover the lubricating oil from the static pressure chamber.

In the above aspect of the invention, in a hydrostatic guide structure, a load between the first and second members relatively movable to each other is supported by a static pressure of a lubricating oil in the static pressure chamber. As the hydrostatic guide structure, one of an encapsulation type hydrostatic guide structure and a flow type or circulation type hydrostatic guide structure is usable.

In the encapsulation type hydrostatic guide structure, only the supply passage is connected to the static pressure chamber, but the recovery passage is not connected thereto. The lubricating oil is supplied through the supply passage to fill the static pressure chamber by a predetermined pressure. When the lubricating oil in the static pressure chamber is reduced, a lubricating oil is additionally supplied from the supply passage. In the flow type hydrostatic guide structure, the supply passage and the recovery passage are connected to the static pressure chamber. The lubricating oil is supplied through the supply passage to flow through the static pressure chamber to generate a static pressure, and is recovered from the static pressure chamber to the recovery passage.

In the flow type hydrostatic guide structure, the lubricating oil recovered from the recovery passage is recycled into the supply passage, thereby providing the circulation type hydrostatic guide structure.

The hydrostatic pressure guide mechanism in the above aspect of the invention is provided by a hermetically-closed hydrostatic guide structure in which the periphery of the static pressure chamber is sealed. Accordingly, in the hydrostatic pressure guide mechanism in the above aspect of the invention, the lubricating oil can be prevented from overflowing to the outside through the periphery, or the overflowing of the lubricating oil can be restricted to the minimum level.

Further, even when the hydrostatic pressure guide mechanism and the sliding guide mechanism are simultaneously provided, the possibility that the lubricating oil overflowing from the hydrostatic pressure guide mechanism adversely affects the sliding guide mechanism (e.g., mixing of different kinds of lubricating oils) can be eliminated.

With this arrangement, the hydrostatic pressure guide mechanism and the sliding guide mechanism can be simultaneously provided in a guide mechanism. A high load capacity and a low friction can be secured by the hydrostatic pressure guide mechanism and the guiding accuracy and the damping performance can be secured by the sliding guide mechanism. As a result, the guide mechanism having a high load capacity, a low friction, a high guiding accuracy and a high damping performance can be provided.

In the aspect of the invention, the supply passage and the recovery passage can be provided by a passage formed by the first and second members relatively movable to each other and a pipe connected to the first and second members. To the supply passage and the recovery passage, a pump for driving the lubricating oil, a tank for storing the lubricating oil, and the like can be connected. A measuring gauge for detecting conditions (e.g., a pressure and a flow rate) of the lubricating oil may be provided in the supply passage and the recovery passage.

As the recovery passage, not only a pipe hermetically closeable from the outside but also a passage open to outer atmosphere are usable. For instance, a recovery passage (e.g., a drain) usable for a typical hydrostatic pressure guide mechanism is usable.

In the above aspect of the invention, the first and second members relatively movable to each other are combination of the guide member extending in the moving direction and the movement member relatively movable along the guide member (e.g., a set of a rail and a slider forming the guide mechanism for the machine tool).

The guide member and the movement member move relatively to each other. For instance, the movement member may be fixed to the machine tool and the guide member may move relatively to the movement member.

In the above aspect of the invention, it is preferable that the supply passage supplies the lubricating oil to near the periphery of the static pressure chamber, and the recovery passage recovers the lubricating oil from a center of the static pressure chamber.

With this arrangement, the lubricating oil is supplied from the supply passage to near the periphery of the static pressure chamber. The supplied lubricating oil flows toward the center of the static pressure chamber and is recovered from the recovery passage connected to the center of the static pressure chamber.

By thus recovering the lubricating oil from the center, the flow rate of the lubricating oil used in the hydrostatic pressure guide mechanism is reducible.

Specifically, in a typical hydrostatic pressure guide mechanism, in order to generate a desired static pressure in the static pressure chamber (i.e., a recess) on an inner side of the hydrostatic pressure guide mechanism, a pressure holding portion (i.e., a land) is formed along the periphery of the static pressure chamber. The lubricating oil in the static pressure chamber is discharged from the periphery through the pressure holding portion formed along the periphery. In this arrangement, since the pressure holding portion formed along the periphery has a circumferential length in proportion to a radius of the pressure holding portion, in order to secure a predetermined a flow speed (i.e., a flow speed for keeping a desired pressure in the static pressure chamber on the inner side), a considerably large amount of the entire flow rate is required.

In order to supply such a large flow rate, the supply device requires a large capacity, so that an increase in a pipe diameter and an increase in size of the device are inevitable.

In contrast, in the above aspect of the invention, since the recovery of the oil is conducted from the center, the pressure holding portion only needs to be formed near a recovery opening and a circumferential length of the pressure holding portion is much shorter. Accordingly, the flow rate of the lubricating oil can be significantly reduced and the supply device, the supply passage and the recovery passage of the lubricating oil can be reduced in size and simplified.

In the guide mechanism according to the above aspect of the invention, it is preferable that the first member is a guide member and the second member is a movement member relatively movable along the guide member, the guide member includes a smooth guide surface, and the hydrostatic pressure guide mechanism and the sliding guide mechanism are formed between the movement member and the guide surface and use the guide surface in common.

With this arrangement, the main structures (e.g., static pressure chamber and oil supply groove) of the hydrostatic guide mechanism and the sliding guide mechanism are collectively provided to the movement member that is the second member of the two relative movable members while only the guide surface is formed on the guide member that is the first member of the two members.

In other words, the hydrostatic guide mechanism and the sliding guide mechanism use the guide surface in common, the structures of the hydrostatic guide mechanism and the sliding guide mechanism can be simplified as compared with a structure in which each of the mechanisms has the guide surface, so that the entire movement mechanism can be reduced in size.

Moreover, since the main structures (e.g., static pressure chamber and oil supply groove) of the hydrostatic guide mechanism and the sliding guide mechanism can be collectively provided to the movement member, the structures of the hydrostatic guide mechanism and the sliding guide mechanism can also be simplified. Further, since the hydrostatic guide mechanism and the sliding guide mechanism can be juxtaposed on the surface of the movement member facing the guide surface, the load can be reliably shared by the hydrostatic guide mechanism and the sliding guide mechanism.

A length of each of the two relatively movable members (guide member and movement member) may be appropriately determined. The length of one of the two members may be longer than that of the other of the two members. Alternatively, the two members may have the same length.

With this arrangement, the main structure (e.g., static pressure chamber forming the hydrostatic guide mechanism) of the hydrostatic guide mechanism and the main structure (e.g., oil supply groove) of the sliding guide mechanism only need to be basically provided to the movement member. However, one of the main structures may be provided to the guide member.

Further, the two relatively movable members may be the bearing member and the rotary shaft that is supported by the bearing member and rotatable around the bearing member.

The arrangement in which the two relatively movable members are provided by the bearing member and the rotary shaft that is supported by the bearing member and rotatable around the bearing member is exemplified by a thrust bearing. In the thrust bearing, a slide surface for receiving a thrust load in the axial direction is formed between the rotary shaft and the bearing member. In this arrangement, the rotary shaft with respect to the slide surface is defined as the guide member and the slide surface is formed as a smooth guide surface, whereby the main structures of the hydrostatic guide mechanism and the sliding guide mechanism can be formed on the slide surface of the bearing member.

Alternatively, the hydrostatic guide mechanism and the sliding guide mechanism can be incorporated to the rotary shaft in the same manner.

In this arrangement, the lubricating oil for the hydrostatic guide mechanism and the lubricating oil for the sliding guide mechanism can be supplied from the bearing member to the rotary shaft via a rotary joint.

When the rotary shaft is fixed and the bearing member around the rotary shaft is rotatable, the main structures of the hydrostatic guide mechanism and the sliding guide mechanism can be formed on the slide surface of the fixed rotary shaft and the slide surface of the bearing member can be defined as a smooth guide surface.

It should be noted that the invention is applicable to a radial bearing. In the radial bearing, the hydrostatic guide mechanism and the sliding guide mechanism are formed in a curve shape between an outer circumferential surface of the rotary shaft and an inner circumferential surface of the bearing member.

In the guide mechanism according to the above aspect of the invention, it is preferable that the movement member includes: the static pressure chamber facing the guide surface; and a seal portion surrounding the static pressure chamber, and the static pressure chamber and the guide surface define the hydrostatic pressure guide mechanism.

With this arrangement, the lubricating oil is supplied from the supply passage into the static pressure chamber to form an oil film between an inner surface of the static pressure chamber and the guide surface, so that the hydrostatic guide mechanism in a form of the oil film can float and support the guide member.

In this arrangement, the lubricating oil in the static pressure chamber is supplied to the static pressure chamber through the supply passage to support the load from the guide member in the static pressure chamber and moves inward from the outer circumference of the static pressure chamber, whereby all the amount of the lubricating oil is recovered through the recovery passage at the center.

Moreover, the seal portion surrounding the static pressure chamber in the periphery thereof prevents the lubricating oil from leaking outside through the seal portion, thereby forming the hermetically-closed hydrostatic pressure guide mechanism.

With this arrangement, as described above, the flow rate of the lubricating oil can be reduced by recovering the lubricating oil from the center through the recovery passage connected to the center of the static pressure chamber, so that the supply device, the supply passage and the recovery passage of the lubricating oil can be reduced in size and simplified.

In this arrangement, a recess having a predetermined depth (about several ten microns) formed on the surface of the movement member is usable as the static pressure chamber.

In the static pressure chamber, an isobaric groove concentric with the static pressure chamber is formed in the static pressure chamber. The static pressure chamber is divided into an outer side and an inner side. The inner side can be defined as the pressure holding portion (land) and the outer side is defined as the static pressure chamber body (recess). Even when the pressure holding portion on the inner side and the static pressure chamber body on the outer side have the same depth, the pressure holding portion on the inner side can generate a pressure holding effect in the static pressure chamber body by forming the isobaric groove having a larger depth than those of the pressure holding portion and the static pressure chamber body. Accordingly, the static pressure chamber body can receive the load by the static pressure of the lubricating oil, thereby functioning as the hydrostatic pressure guide mechanism.

The pressure holding portion having a shallow depth and surrounding the recovery passage (i.e., the land higher than the static pressure chamber body on the outer side) may be formed, thereby functioning as the hydrostatic pressure guide mechanism.

The planar shape of the static pressure chamber can be circular, oblong or elliptical, or alternatively, may be rectangular (e.g., square) or other polygonal shapes. Even when the planar shape of the static pressure chamber is rectangular or polygonal, sharp apexes are desirably rounded to form an arc.

As the seal portion, a seal groove deeper than the static pressure chamber, which is formed along the periphery of the static pressure chamber, and an annular seal member provided inside the seal groove can be combined in use.

As the seal member, a suitable seal member secures the sealing performance by being brought into hermetic contact with the bottom of the static pressure chamber and the guide surface of the guide member facing the bottom of the static pressure chamber. A molded article formed of an elastomer material having a height exceeding the depth of the static pressure chamber is usable. For instance, an oil resistant O ring and the like are usable. Addition of a lip seal is effective so as to receive a high pressure in the static pressure chamber and prevent leakage of the lubricating oil.

The planar shape of the seal portion only needs to correspond to an outline of the static pressure chamber and can be circular, rectangular and other shapes similar to the shape of the static pressure chamber.

In this arrangement, the recovery passage only needs to communicate with the center of the static pressure chamber. As long as being close to the center of the static pressure chamber, the center of the static pressure chamber is not necessarily geometrical center.

The supply passage only needs to communicate with a peripheral side of the static pressure chamber beyond the recovery passage and may communicate with a side close to the periphery of the static pressure chamber, an inner side of the seal groove of the seal portion, or the like. In this arrangement, the supply passage only needs to communicate with any position of the seal groove, but may communicate with a plurality positions of the seal portion so as to avoid uneven sealing performance.

In the guide mechanism according to the above aspect of the invention, it is preferable that the movement member includes: a slide surface facing the guide surface; and an oil supply groove formed on the slide surface, and the slide surface and the guide surface define the sliding guide mechanism.

With this arrangement, the guide surface and the slide surface form the sliding guide mechanism, thereby supplying the lubricating oil through the supply groove into between the guide surface and the slide surface, so that a sliding performance as the sliding guide mechanism can be sufficiently secured.

In this arrangement, the lubricating oil to be supplied into between the guide surface and the slide surface of the sliding guide mechanism is desirably the same as the lubricating oil to be supplied into the hydrostatic guide mechanism.

When the lubricating oil of the sliding guide mechanism and the lubricating oil of the hydrostatic guide mechanism are the same, even when the lubricating oil is leaked from the hydrostatic pressure guide mechanism and is mixed with the lubricating oil of the sliding guide mechanism, no trouble occurs since both of the lubricating oils are the same.

However, in the guide mechanism for the machine tool in the aspect of the invention, the lubricating oil of the sliding guide mechanism and the lubricating oil of the hydrostatic guide mechanism may be different. Even in this arrangement, since the periphery of the hydrostatic guide mechanism is basically sealed, mixing of the different lubricating oils can be avoided.

For instance, since the periphery of the hydrostatic guide mechanism is sealed, leakage of the lubricating oil from the hydrostatic guide mechanism is slight, so that mixing of the lubricating oil in the sliding guide mechanism is sufficiently allowable. Moreover, since the outer circumference of the hydrostatic guide mechanism is sealed, the lubricating oil leaked from the sliding guide mechanism is inhibited from mixing with the lubricating oil of the hydrostatic guide mechanism.

Further, even when the lubricating oil of hydrostatic pressure leaks from the hydrostatic guide mechanism to mix with the lubricating oil of the sliding guide mechanism, the lubricating oil discharged from the sliding guide mechanism is generally wasted to cause no trouble.

Thus, by using the same lubricating oil for the sliding guide mechanism and the hydrostatic guide mechanism, a part of the supply passage can also be used in common. However, the part practically usable in common is limited to the tank for storing the lubricating oil and a surrounding area of the tank, since the lubricating oil is supplied in a continuous manner to the hydrostatic guide mechanism at a relatively large flow rate whereas the lubricating oil is supplied in an intermittent manner to the sliding guide mechanism at a relatively small flow rate.

It should be noted that, although the large amount of the lubricating oil supplied to the hydrostatic guide mechanism is recovered, for instance, to the supply tank to be prevented from leaking outside, the lubricating oil supplied to the sliding guide mechanism is not recovered to the supply tank since the amount of the lubricating oil is small, but may be recovered to a separate tank to be wasted.

In the guide mechanism according to the above aspect of the invention, it is preferable that the sliding guide mechanism is provided inside the machine tool and the hydrostatic pressure guide mechanism is fixed to each end of the sliding guide mechanism.

With this arrangement, when two portions of the machine tool relatively move, the sliding guide mechanism inside the machine tool and the hydrostatic guide mechanisms on both sides of the sliding guide mechanism each function effectively, thereby providing a guiding performance in a combination of the performances of the respective mechanisms.

Further, the sliding guide mechanism inside the machine tool and the hydrostatic guide mechanisms on both sides of the sliding guide mechanism can be placed so as to use the same guide member in common. The structure of the guide mechanism can be simplified by such a common use, so that the entire machine tool can be reduced in size. Furthermore, the guide mechanism with this arrangement is easily achievable by attaching external hydrostatic guide mechanisms to both sides of the sliding guide mechanism provided inside an existing machine tool.

A guide mechanism simultaneously functioning as the hydrostatic guide mechanism and the sliding guide mechanism is easily achievable by adding the hydrostatic guide mechanism to the existing machine tool including the sliding guide mechanism. Consequently, the guide mechanism for the machine tool having a high load capacity, a low friction, a high guiding accuracy and a high damping performance can be provided.

According to another aspect of the invention, a machine tool includes the guide mechanism for a machine tool according to the above aspect of the invention.

With this arrangement, the same advantages of the hydrostatic guide mechanism described above can be obtained, so that the entire machine tool can function effectively.

The machine tool according to the aspect of the invention preferably further includes a fixed member; a movement member configured to move in a horizontal direction relative to the fixed member; and a guide mechanism for supporting a load extending in the horizontal direction and a guide mechanism for tilt prevention configured to resist inclination relative to the guide mechanism for supporting the load, the guide mechanisms being provided between the fixed member and the movable member.

In this arrangement, the fixed member supports the movement member in such a manner that the movement member is movable. The fixed member is exemplified by the cross bar of the machine tool. The fixed member is not necessarily fixed, but includes a member movable relative to another member. The movement member is movably supported by the fixed member and is exemplified by the spindle head of the machine tool.

In a part of the existing machine tool, the spindle head is supported in cantilever manner by the guide mechanism for supporting the load. In such an arrangement that the spindle head is supported in cantilever manner, a supporting structure is deformed by the weight of the spindle head to cause the spindle head to be tiled or fall. In order to prevent or compensate such deformation, the guide mechanism for tilt prevention is provided to a typical machine tool.

As the guide mechanism for tilt prevention in this arrangement, the above-described arrangement of the guide mechanism simultaneously functioning as the hydrostatic guide mechanism and the sliding guide mechanism or an arrangement in which a part of the guide mechanism for tilt prevention is provided by the hydrostatic guide mechanism and the rest of the guide mechanism is provided by the sliding guide mechanism and the functions of the respective mechanisms are combined is provided. Accordingly, the guide mechanism supports the load and prevents the machine tool from tilting. In this arrangement, the guide mechanism for the machine tool having a high load capacity, a low friction, a high guiding accuracy and a high damping performance can be provided.

According to the guide mechanism for the machine tool and the machine tool in the aspect of the invention, the sliding guide mechanism and the hydrostatic guide mechanism can be simultaneously provided. A high load capacity and a low friction can be secured by the hydrostatic pressure guide mechanism and the guiding accuracy and the damping performance can be secured by the sliding guide mechanism. Consequently, the guide mechanism having a high load capacity, a low friction, a high guiding accuracy and a high damping performance and the machine tool having the guide mechanism can be provided.

BRIEF DESCRIPTION OF DRAWING(S)

DESCRIPTION OF EMBODIMENT(S)

First Exemplary Embodiment

FIGS. 1 to 6 show a first exemplary embodiment of the invention.

Figure 1:
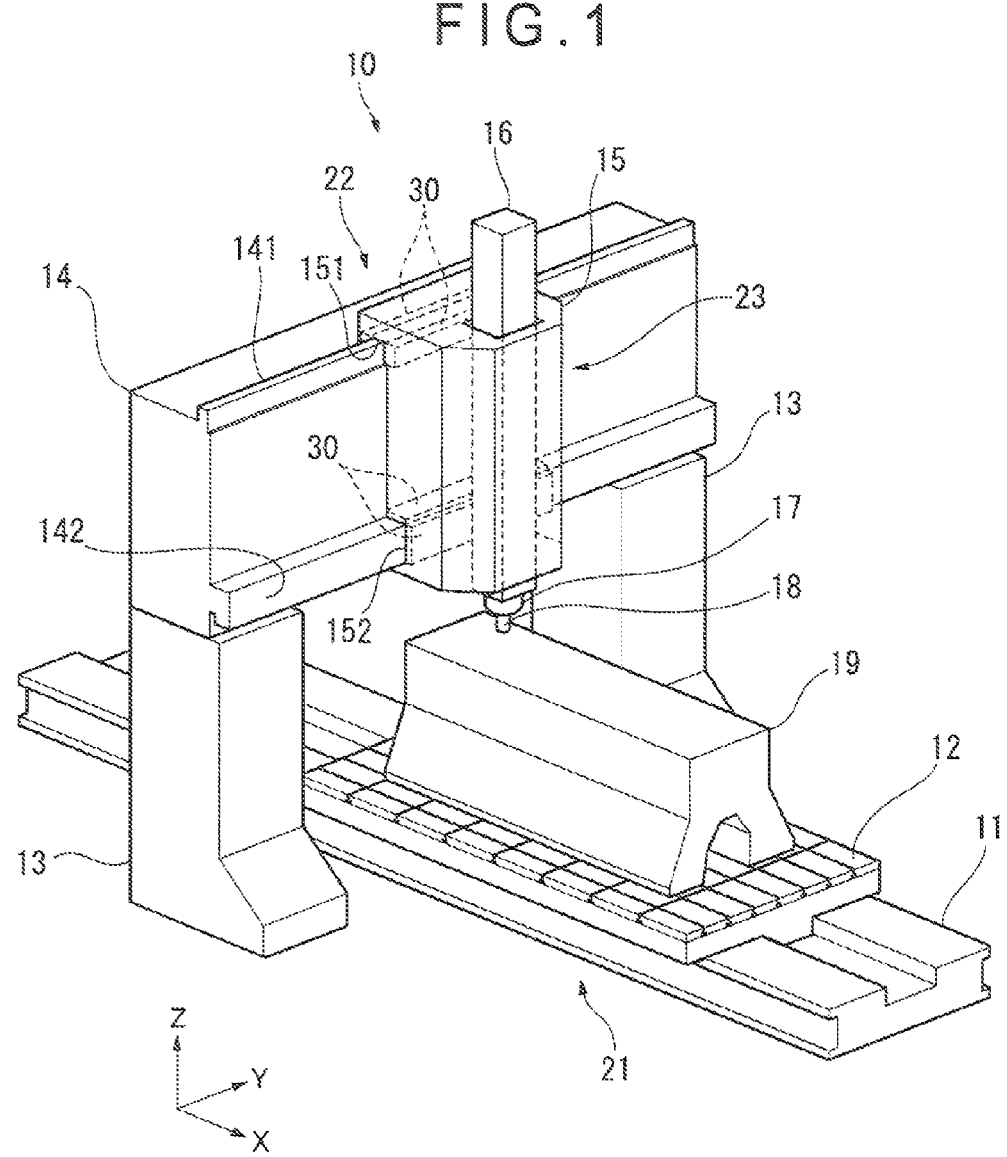
FIG. 1 is a perspective view showing an entire device according to a first exemplary embodiment of the invention.

As shown in FIG. 1, the machine tool 10 includes a platform 11 extending in the X-axis direction and a table 12 supported by the platform 11. A pair of columns 13 are provided on both sides of the platform 11. A cross bar 14 extends in the Y-axis direction between upper ends of the columns 113. A head 15 is supported by the cross bar 14. A ram 16 extending in the Z-axis direction (vertical direction) is attached to the head 15.

A workpiece 19, which is an object to be machined, is fixed on a top surface of the table 12. A main spindle 17 is exposed from a lower end of the ram 16. A machining tool 18 is attached to the main spindle 17.

In the machine tool 10, the tool 18 can be moved in three dimensions relatively to the workpiece 19 by moving the table 12 in the X-axis direction, moving the head 15 in the Y-axis direction, and moving the ram 16 in the Z-axis direction. With this relative movement, the workpiece 19 can be machined into any shapes.

In order to machine the workpiece in three dimensions as described above, the machine tool 10 is provided with an X-axis movement mechanism 21 for moving the table 12 in the platform 11, a Y-axis movement mechanism 22 for moving the head 15 along the cross bar 14, and a Z-axis movement mechanism 23 for moving the ram 16 relative to the head 15.

The X-axis movement mechanism 21, the Y-axis movement mechanism 22, and the Z-axis movement mechanism 23 each support a moving portion (e.g., the table 12 relative to the platform 11) in a manner to allow the moving portion to be moved, and each include a guide mechanism that guides the moving portion in a predetermined moving direction and a drive mechanism (e.g., a motor) that drives the moving portion based on an external command.

In the Y-axis movement mechanism 22 for the head 15 and the cross bar 14 among the movement mechanisms 21 to 23, a plurality of guide mechanisms 30 (see, first to sixth guide mechanisms 30A to 30F, FIG. 2) extending in the Y-axis direction are employed.

Figure 2:
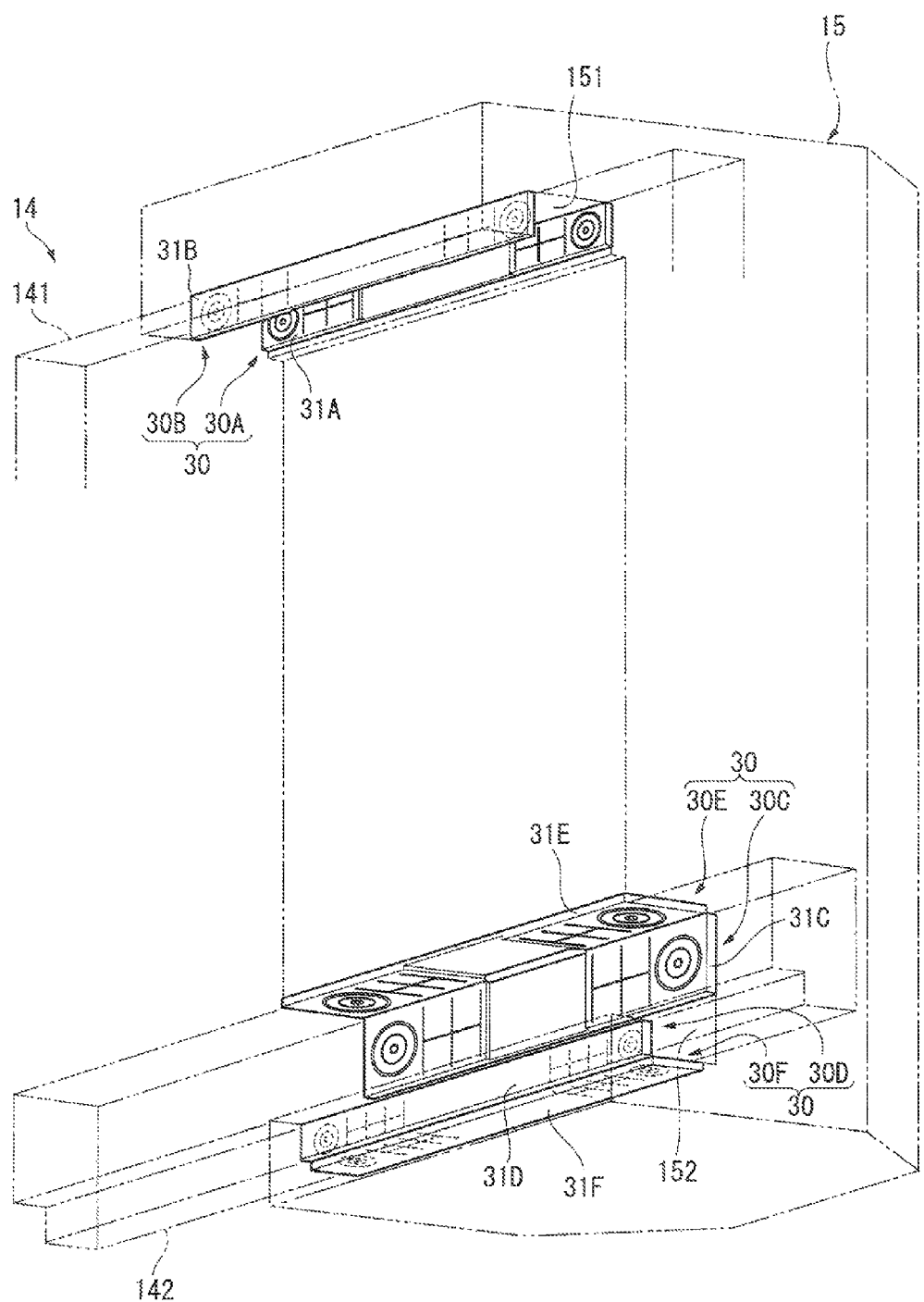
FIG. 2 is a perspective view showing a layout of a movement member according to the first exemplary embodiment.

As shown in FIG. 2, the cross bar 14 includes: a first rail 141 provided to an upper portion of a side of the cross bar 14 to which the head 15 is attached; and a second rail 142 provided to a lower portion of the side of the cross bar 14 to which the head 15 is attached. The head 15 includes: a first groove 151 facing downward and provided to an upper portion of the head 15 near the cross bar 14; and a second groove 152 provided to a lower portion of the head 15 near the cross bar 14.

The second groove 152 formed in the head 15 is engaged with the second rail 142 of the cross bar 14, thereby supporting a load in the Z-axis direction and restricting a position of the head 15 in the X-axis direction.

The first groove 151 formed in the head 15 is engaged with the first rail 141 of the cross bar 14, thereby restricting the position of the head 15 in the X-axis direction and restricting the head 15 from tilting due to its own weight around the second rail 142 supporting the load.

First and second movement members 31A and 31B for holding the first rail 141 therebetween in the X-axis direction are provided on an inner side of the first groove 151. Using the first rail 141 as a guide member, the first and second movement members 31A and 31B respectively provide first and second guide mechanisms 30A and 30B according to the first exemplary embodiment.

On an inner side of the second groove 152, third and fourth movement members 31C and 31D are provided to hold the second rail 142 therebetween in the X-axis direction and fifth and sixth movement members 31E and 31F are provided to hold the second rail 142 therebetween in the Z-axis direction. Using the first rail 141 as a guide member, the third to sixth movement members 31C to 31F respectively provide third to sixth guide mechanisms 30C to 30F according to the first exemplary embodiment.

Guide Mechanism 30

Figure 3:
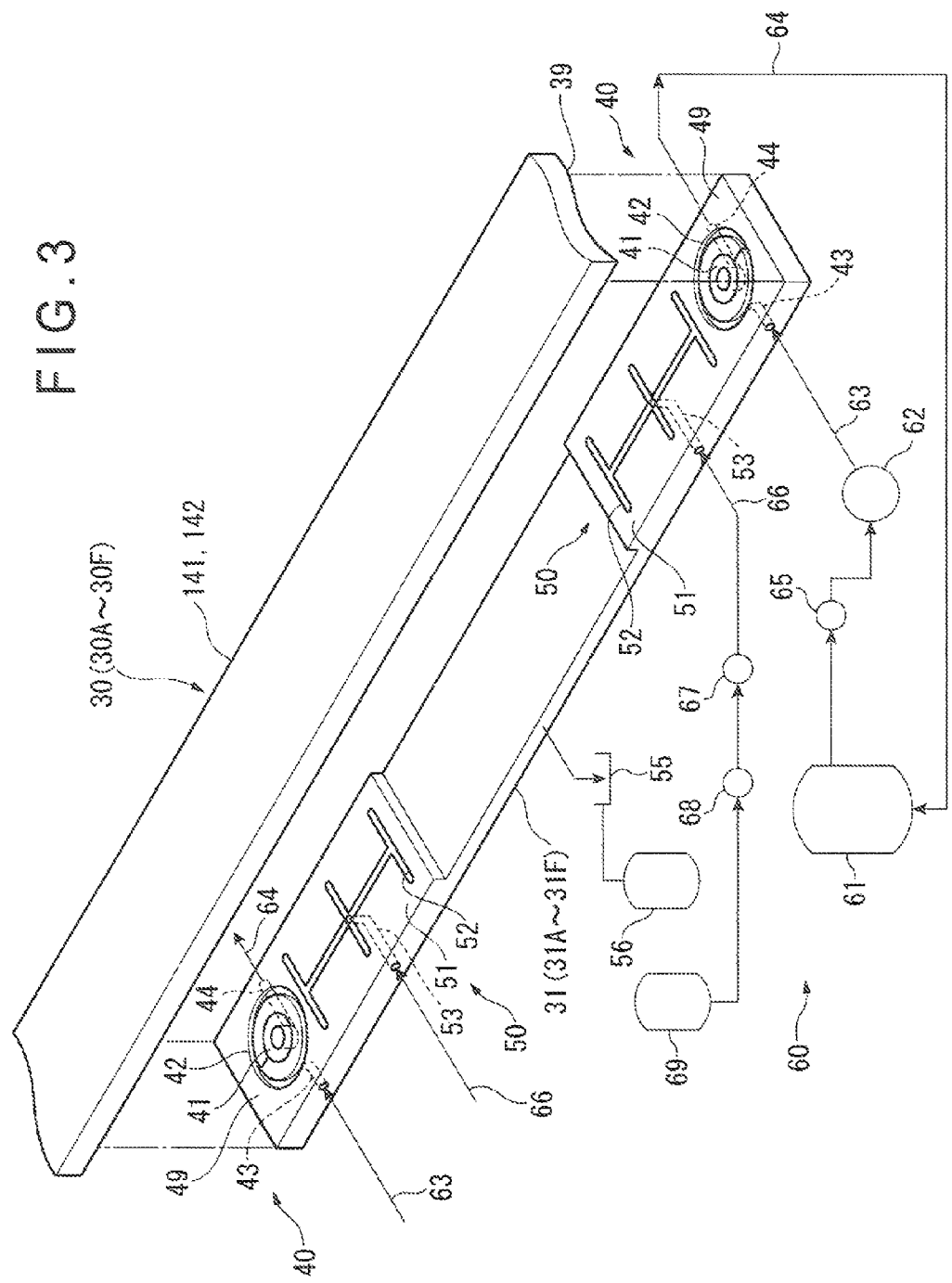
FIG. 3 is an exploded perspective view showing a movement mechanism according to the first exemplary embodiment.

As shown in FIG. 3, a guide mechanism 30 (first to sixth guide mechanisms 30A to 30F, see FIG. 2) includes: a movement member 31 (movement members 31A to 31F, see FIG. 2) and the first and second rails 141 and 142 as the guide member, the movement member and the guide member being relatively movable to each other.

The movement member 31 (the first to sixth movement members 31A to 31F) is a member extending in a relative moving direction of the guide mechanism 30 and is formed with use of a plate fixed to the head 15 along the first and second grooves 151 and 152 or a part of the head 15.

Thick stepped portions are formed at both ends on a side of the movement member 31 facing the first and second rails 141 and 142. A surface of each of the thick stepped portions functions as a smooth surface 49 and a slide surface 51. The movement member 31 has a pair of lateral surfaces in a direction orthogonal to a thickness direction of the movement member 31.

The first and second rails 141 and 142 are members extending in a relative moving direction of the guide mechanism 30 and are formed with use of a separate member fixed along to the cross bar 14 or a part of the cross bar 14.

A surface of each of the first and second rails 141 and 142 facing the movement member 31 is defined as a guide surface 39 that is smooth along the whole length.

The movement member 31 and the first and second rails 141 and 142 are disposed such that the smooth surface 49 and the slide surface 51 at each end of the movement member 31 are in hermetic contact with the guide surface 39 of each of the first and second rails 141 and 142, thereby providing the guide mechanism 30.

In this arrangement, a hydrostatic pressure guide mechanism 40 is formed between the smooth surface 49 and the guide surface 39 while a sliding guide mechanism 50 is formed between the slide surface 51 and the guide surface 39.

A sheet formed using a low friction material (e.g., tetrafluoroethylene) is adhered continuously all over the slide surface 51 and the smooth surface 49.

It should be noted that the smooth surface 49 on an outer side of the hydrostatic pressure guide mechanism 40 may be cut deeper than the slide surface 51 and be provided as a flank surface in no contact with the guide surface 39.

The hydrostatic pressure guide mechanism 40 floats and supports the first and second rails 141 and 142 by static pressure against the movement member 31, using pressurized lubricating oil to be supplied from the outside, which will be described below in detail. In order to supply and recover the lubricating oil for such an intended use, a lubricating oil supply device 60 is connected to the hydrostatic pressure guide mechanism 40.

Figure 4:
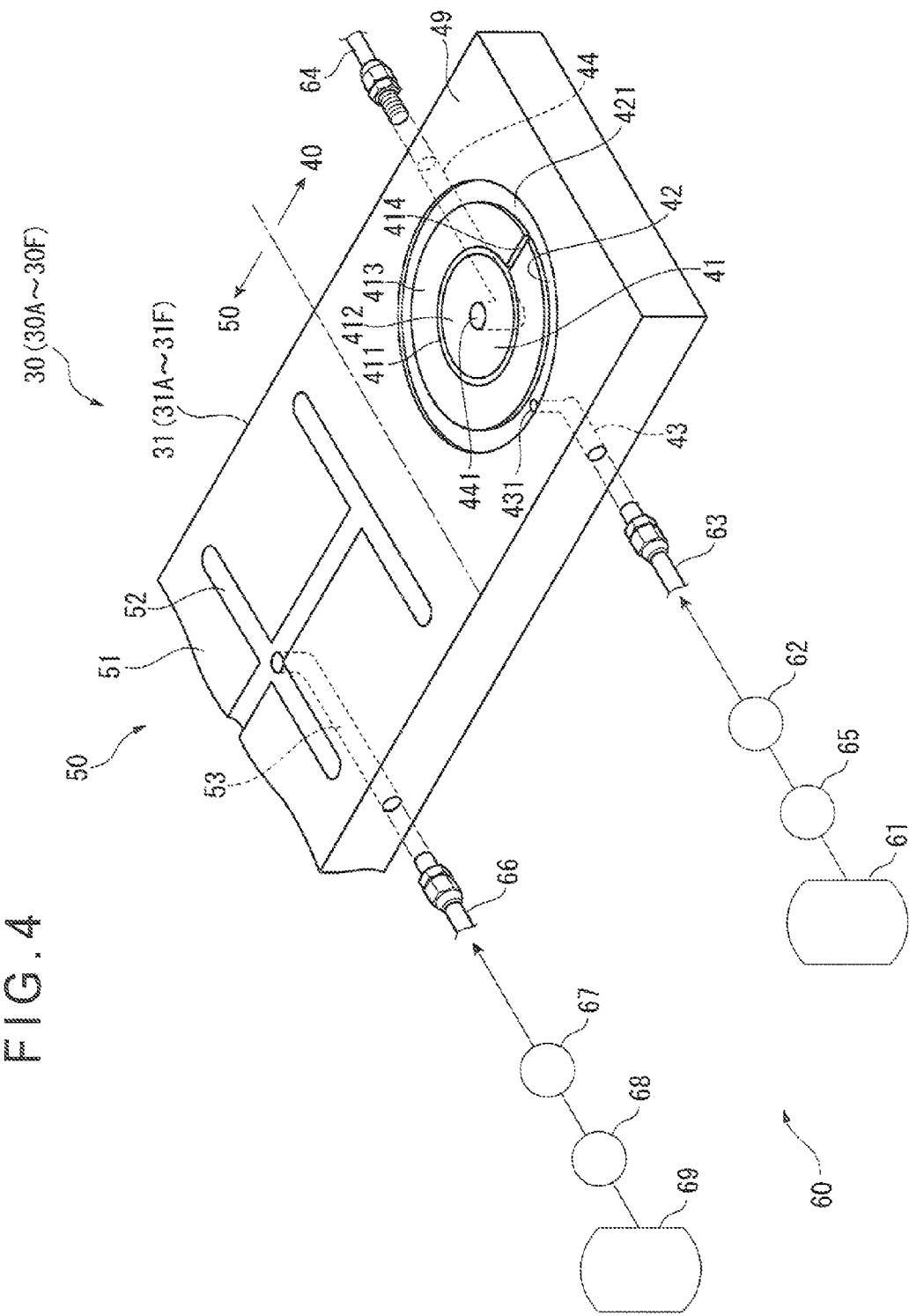
FIG. 4 is a perspective view showing a relevant part of a hydrostatic pressure guide mechanism and a sliding guide mechanism provided to the movement member according to the first exemplary embodiment.

As shown in FIGS. 3 and 4, the lubricating oil supply device 60 includes: a tank 61 that stores the lubricating oil; and a supply pipe 63 and a recovery pipe 64 that connect the tank 61 to the hydrostatic pressure guide mechanism 40.

A filter 65 that filters the lubricating oil passing therethrough and a pump 62 that pressurizes the lubricating oil are installed in the supply pipe 63.

With this arrangement, the lubricating oil supply device 60 takes out the lubricating oil stored in the tank 61 through the supply pipe 63, filters the lubricating oil using the filter 65, and subsequently pumps the filtered lubricating oil using the pump 62, so that the lubricating oil can be supplied to the hydrostatic pressure guide mechanism 40. Moreover, the recovery pipe 64 can recover the lubricating oil from the hydrostatic pressure guide mechanism 40 and return the lubricating oil to the tank 61.

The lubricating oil supply device 60 also supplies the lubricating oil to be used in the sliding guide mechanism 50.

As shown in FIGS. 3 and 4, the lubricating oil supply device 60 includes: a tank 69 that stores the lubricating oil; and a supply pipe 66 that connects the tank 69 to the sliding guide mechanism 50.

A filter 68 that filters the lubricating oil passing therethrough and a pump 67 that intermittently pumps the lubricating oil at a suitable amount are installed in the supply pipe 66.

As a discharge passage of the lubricating oil supplied to the sliding guide mechanism 50, a recovery pipe 55 that receives the lubricating oil discharged from the sliding guide mechanism 50 and a waste oil tank 56 that stores the lubricating oil collected by the recovery pipe 55 are provided below the lateral surface of the movement member 31. The discharge passage is occasionally provided by a pipe as needed.

In other words, in the first exemplary embodiment, the same kind of the lubricating oil is supplied to both of the hydrostatic pressure guide mechanism 40 and the sliding guide mechanism 50 by the lubricating oil supply device 60.

However, the amount of the lubricating oil to be used in the sliding guide mechanism 50 is sufficiently lower than that in the hydrostatic pressure guide mechanism 40. Moreover, the lubricating oil is intermittently supplied in the sliding guide mechanism 50. In order to handle the different supply conditions, the lubricating oil supply passage to the sliding guide mechanism 50 and the lubricating oil supply passage to the hydrostatic pressure guide mechanism 40 are provided as completely independent systems.

The hydrostatic pressure guide mechanism 40 and the sliding guide mechanism 50 in the first exemplary embodiment will be described below.

Hydrostatic Pressure Guide Mechanism 40

Figure 5:
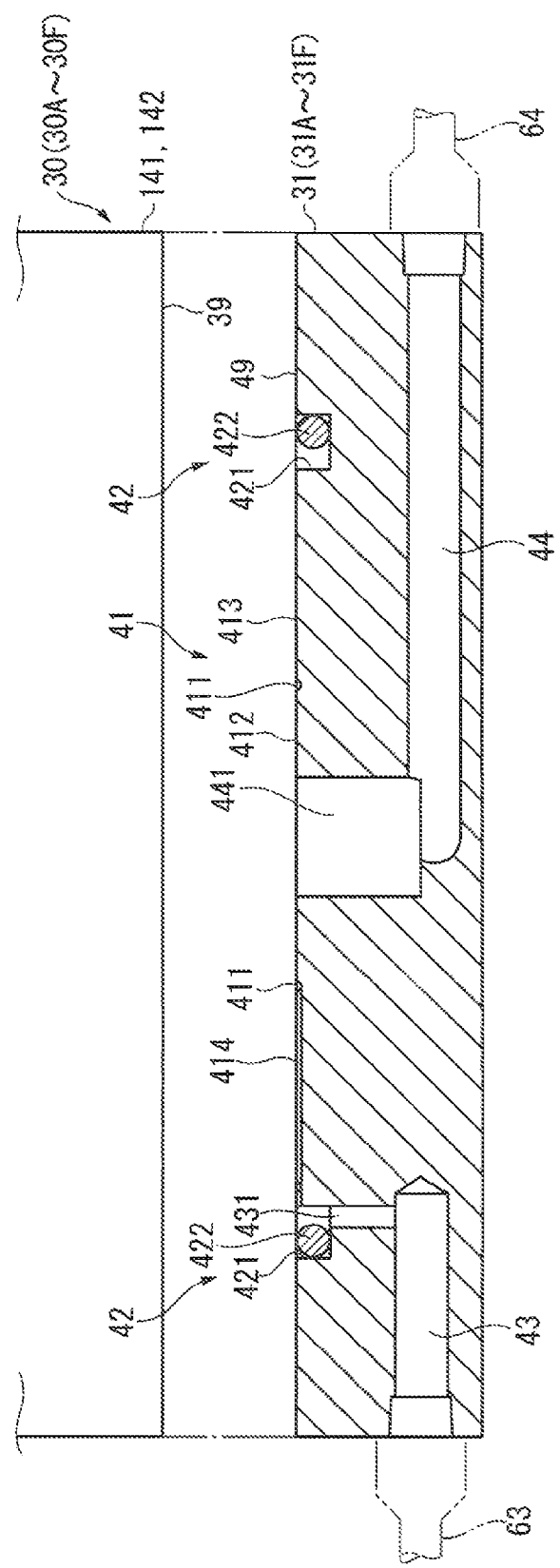
FIG. 5 is a cross-sectional view showing the hydrostatic pressure guide mechanism according to the first exemplary embodiment.

As shown in FIGS. 4 and 5, in the first exemplary embodiment, the smooth surface 49 of the hydrostatic pressure guide mechanism 40 and the slide surface 51 of the sliding guide mechanism 50 define a continuously flat surface.

Specifically, a static pressure chamber 41 and other elements are formed on an extension of the slide surface 51 on which the sliding guide mechanism 50 is formed, and the first and second rails 141 and 142 (i.e., guide member) face the static pressure chamber 41 to cover the static pressure chamber 41 with the guide surface 39, thereby providing the hydrostatic pressure guide mechanism 40.

As shown in FIG. 4, the hydrostatic pressure guide mechanism 40 includes: the circular static pressure chamber 41 shaped as a recess on the smooth surface 49; and an annular seal portion 42 in a form of a ring continuously surrounding the static pressure chamber 41.

Although the static pressure chamber 41 is depicted as a recess in FIGS. 3 and 5, the static pressure chamber 41 becomes a closed space covered with the guide surfaces 39 of the first and second rails 141 and 142 in the assembled guide mechanism 30.

A communication hole 431 of a supply passage 43 communicates with a part of the seal portion 42.

The above-described supply pipe 63 of the lubricating oil supply device 60 is connected to the supply passage 43. The pressurized lubricating oil is supplied into the static pressure chamber 41 through the supply pipe 63.

A communicating hole 441 of a recovery passage 44 communicates with the center of static pressure chamber 41.

The above-described recovery pipe 64 of the lubricating oil supply device 60 is connected to the recovery passage 44. The lubricating oil is recovered from the static pressure chamber 41 through the recovery pipe 64.

As also shown in FIG. 5, the communicating hole 441 of the above-described recovery passage 44 communicates with the center of a bottom of the static pressure chamber 41. An annular groove 411 is also formed on the bottom of the static pressure chamber 41 so as to be concentric with the communicating hole 441

The bottom of the static pressure chamber 41 is divided into an inner part 412 and an outer part 413 by the annular groove 411. A communication groove 414 extending in a radial direction from the annular groove 411 to the seal portion 42 is formed on a part of the outer part 413.

The seal portion 42 includes an annular seal groove 421 along a periphery of the static pressure chamber 41. A seal member 422, which is provided by an elastomer molding article (e.g., oil resistant rubber), is disposed in the seal groove 421. The communication hole 431 of the supply passage 43 communicates with a part of the seal groove 421 which is an inner part relative to the seal member 422 (i.e., a part closer to the static pressure chamber 41).

In the hydrostatic pressure guide mechanism 40 with this arrangement, the pressurized lubricating oil is supplied from the supply passage 43 to flow through the seal groove 421 into the static pressure chamber 41. After moving from the outer part 413 to the inner part 412 in the static pressure chamber 41, the pressurized lubricating oil is recovered to the recovery passage 44 through the communicating hole 441.

In this arrangement, the lubricating oil in the static pressure chamber 41 floats and supports the guide surface 39 by the static pressure, thereby effecting the function of the hydrostatic pressure guide mechanism 40.

All the amount of the lubricating oil in the static pressure chamber 41 is recovered through the recovery passage 44. Further, since the periphery of the static pressure chamber 41 is sealed with the seal portion 42, the lubricating oil is prevented from overflowing to the outside.

In the first exemplary embodiment, a thickness of the static pressure chamber 41 (a distance between the inner part 412 and the guide surface 39), in other words, a depth of a recess from the smooth surface 49, is much smaller (about several ten microns) than those of the seal groove 421 and the annular groove 411.

Further, the inner part 412 and outer part 413 are set in the same height. In other words, the depth of the static pressure chamber 41 at the inner part 412 (the depth from the smooth surface 49) is the same as the depth thereof at the outer part 413.

Accordingly, in the assembled guide mechanism 30, the thickness of the static pressure chamber 41 at the outer part 413 (i.e., a distance between the outer part 413 and the guide surface 39) is the same as the thickness of the static pressure chamber 41 at the inner part 412 (i.e., the distance between the inner part 412 and the guide surface 39).

The annular groove 411 is formed between the inner part 412 and the outer part 413 and communicates with the seal groove 421 through the communication groove 414. Accordingly, the pressure of the lubricating oil at the outer part 413 is kept the same as the pressure of the lubricating oil supplied from the supply passage 43 through the communication hole 431.

By this setting, when the lubricating oil flows from the outer part 413 to the inner part 412 in the static pressure chamber 41, the inner part 412 serves as a land or a pressure holding portion.

Specifically, the pressure of the lubricating oil at an outer side (i.e., a region facing the annular groove 411) of the inner part 412 is the same as that at the outer part 413, but is gradually decreased as the lubricating oil flows inward and reaches approximately atmospheric pressure when the lubricating oil reaches the communicating hole 441 of the recovery passage 44.

Since the inner part 412 thus serves as the land or the pressure holding portion, the static pressure for supporting the load can be secured at the outer part 413 serving as a recess or a static pressure chamber body.

Further, since supporting of the load by the lubricating oil using the static pressure in the static pressure chamber 41 is conducted at the outer part 413 provided on an outer side of the static pressure chamber 41 and having a larger area therein, an area of a region receiving the pressure can be expanded and the supporting of the load using the static pressure can be efficiently conducted by the lubricating oil having a high pressure immediately after flowing into the static pressure chamber 41.

Sliding Guide Mechanism 50

As shown in FIG. 4, the sliding guide mechanism 50 has the smooth slide surface 51. An oil supply groove 52 is continuously formed in a planar matrix on the slide surface 51.

Figure 6:
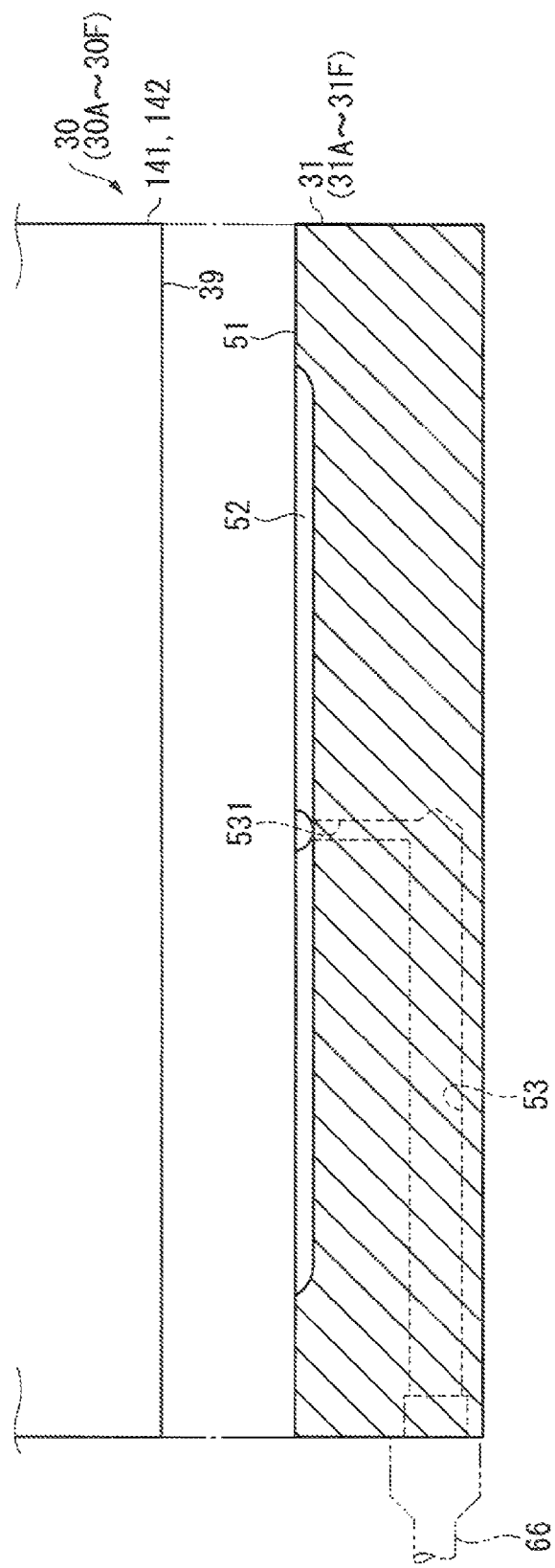
FIG. 6 is a cross-sectional view showing the sliding guide mechanism according to the first exemplary embodiment.

As shown in FIG. 6, the oil supply groove 52 communicates with the oil supply passage 53. The above-described supply pipe 66 of the lubricating oil supply device 60 is connected to the oil supply passage 53.

In the sliding guide mechanism 50, the first and second rails 141 and 142 (the guide member) are supported by bringing the slide surface 51 into contact with the guide surface 39 and are relatively movable by sliding the slide surface 51 and the guide surface 39 on each other.

In the sliding guide mechanism 50, the lubricating oil supplied to the oil supply passage 53 is spread over the slide surface 51 by the oil supply groove 52, whereby slide resistance and wear between the slide surface 51 and the guide surface 39 can be reduced.

In the sliding guide mechanism 50 according to the first exemplary embodiment, the lubricating oil supplied between the guide surface 39 and the slide surface 51 is the same as the lubricating oil supplied to the hydrostatic pressure guide mechanism 40. Accordingly, even when the lubricating oil is leaked from the hydrostatic pressure guide mechanism 40 and is mixed with the lubricating oil in the sliding guide mechanism 50, no trouble occurs since both of the lubricating oils are the same.

Moreover, since the same lubricating oil is used in the sliding guide mechanism 50 and the hydrostatic pressure guide mechanism 40, the same tank is usable in common instead of separate tanks 61 and 69.

Advantages of First Exemplary Embodiment

According to the first exemplary embodiment as described above, the following advantages can be obtained in addition to the respective advantages described in relation to the hydrostatic pressure guide mechanism 40 and the sliding guide mechanism 50.

In the first exemplary embodiment, the hydrostatic pressure guide mechanism 40 is a hermetically-closed hydrostatic pressure guide mechanism, in which the periphery is sealed by the seal portion 42 and the lubricating oil is supplied from the supply passage 43, recovered from the recovery passage 44, and is circulated into tank 61.

Accordingly, in the hydrostatic pressure guide mechanism 40, the lubricating oil can be prevented from overflowing to the outside through the periphery, or the overflowing of the lubricating oil can be restricted to the minimum level.

Further, even when the hydrostatic pressure guide mechanism 40 and the sliding guide mechanism 50 are provided together, the possibility that the lubricating oil overflowing from the hydrostatic pressure guide mechanism 40 adversely affects the sliding guide mechanism 50 can be eliminated.

A high load capacity and a low friction can be secured by the hydrostatic pressure guide mechanism 40 and the guiding accuracy and the damping performance can be secured by the sliding guide mechanism 50. As a result, the guide mechanism 30 having a high load capacity, a low friction, a high guiding accuracy and a high damping performance can be provided.

In the first exemplary embodiment, the movement member 31, which is one of the two mutually relatively movable members described above, collectively includes a main structure (e.g., the static pressure chamber 41 and the oil supply groove 52) of the hydrostatic pressure guide mechanism 40 and the sliding guide mechanism 50. The first and second rails 141 and 142, each of which is the other of the above two members, only have the guide surface 39.

In other words, since the hydrostatic pressure guide mechanism 40 and the sliding guide mechanism 50 use the guide surface 39 of each of the first and second rails 141 and 142 (i.e., the guide member) in common, the respective structures of the hydrostatic pressure guide mechanism 40 and the sliding guide mechanism 50 can be simplified as compared with a structure of each of those having the guide surface, so that an entirety of the guide mechanism 30 can be reduced in size.

Moreover, since the main structures (e.g., the static pressure chamber 41 and the oil supply groove 52) of the hydrostatic pressure guide mechanism 40 and the sliding guide mechanism 50 can be collectively provided to the movement member 31, the structure of the guide mechanism 30 can be further simplified. Further, since the hydrostatic pressure guide mechanism 40 and the sliding guide mechanism 50 are juxtaposed on the surface of the movement member 31 facing the guide surface 39, the load can be reliably shared by the hydrostatic pressure guide mechanism 40 and the sliding guide mechanism 50.

Second Exemplary Embodiment

Figure 7:
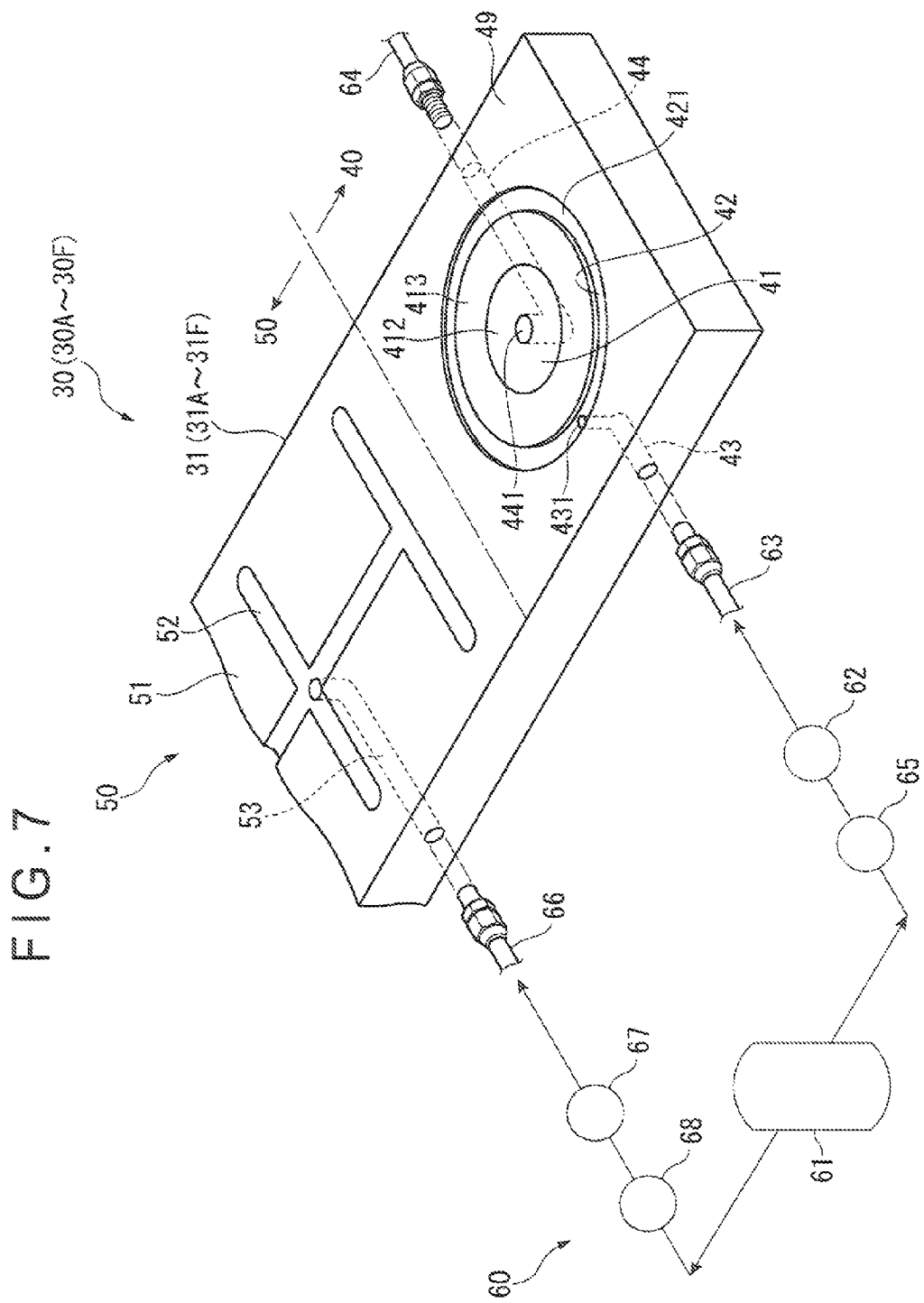
FIG. 7 is a perspective view showing a relevant part of a hydrostatic pressure guide mechanism and a sliding guide mechanism provided to a movement member according to a second exemplary embodiment.
Figure 8:
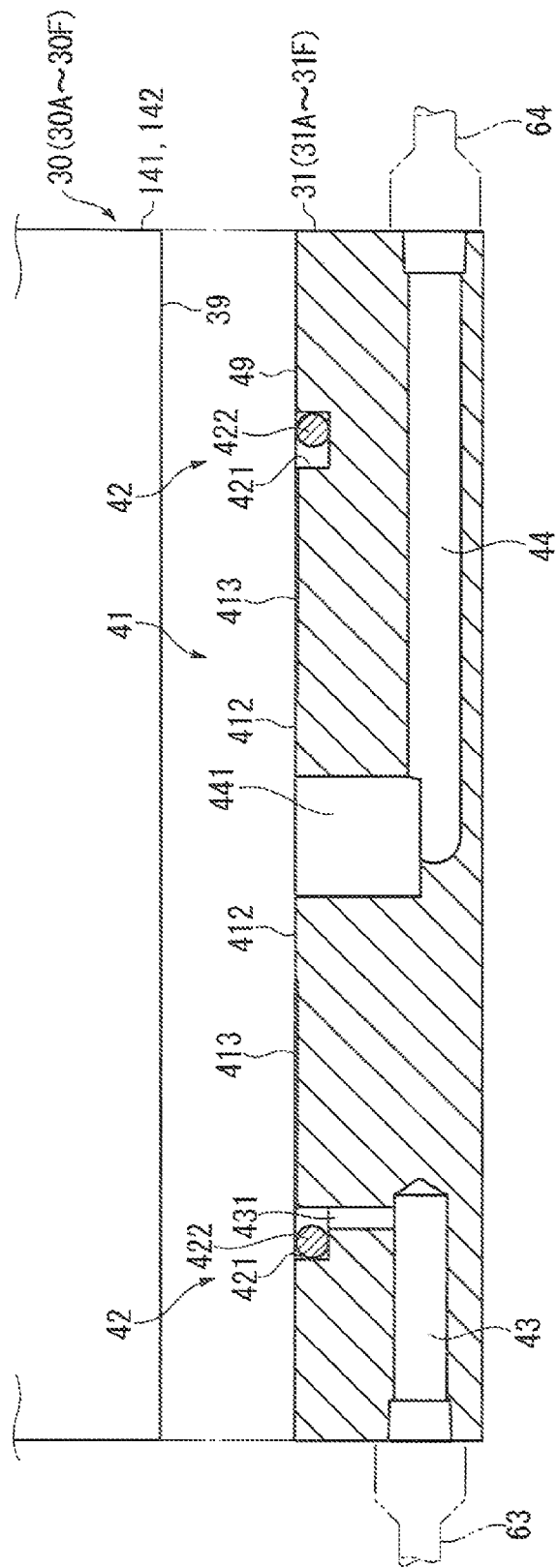
FIG. 8 is a cross-sectional view showing the hydrostatic pressure guide mechanism according to the second exemplary embodiment.

FIGS. 7 to 8 show a second exemplary embodiment of the invention.

In the second exemplary embodiment, the guide mechanism 30 according to the second exemplary is provided to the machine tool 10 similar to that in the first exemplary embodiment.

In the second exemplary embodiment, the respective basic structures of the machine tool 10, the guide mechanism 30, the hydrostatic pressure guide mechanism 40 and the sliding guide mechanism 50 are the same. Hence, a duplicated description is omitted and a different structure(s) will be described below.

In the above first exemplary embodiment, the static pressure chamber 41 of the hydrostatic pressure guide mechanism 40 includes the annular groove 411, the inner part 412, the outer part 413 and the communication groove 414. Although the inner part 412 and the outer part 413 have the same depth, since the annular groove 411 and the communication groove 414 communicate with the seal groove 421, the inner part 412 functions as the pressure holding portion (the land) and the outer part 413 serves as the static pressure chamber body (the recess).

In the second exemplary embodiment, the annular groove 411 and the communication groove 414 are omitted. The depth of the outer part 413 is formed larger than that of the inner part 412. With this arrangement, the inner part 412 functions as the land (the pressure holding portion) and the outer part 413 functions as the recess (the static pressure chamber body).

In the second exemplary embodiment, the depth of the inner part 412 is approximately several ten microns the same as in the first exemplary embodiment. The depth of the outer part 413 is larger than that of the inner part 412.

In the above first exemplary embodiment, the lubricating oil supply device 60 includes the passage for supplying and recovering the lubricating oil to and from the hydrostatic pressure guide mechanism 40, and in addition, includes the passage for supplying the lubricating oil to the sliding guide mechanism 50.

In contrast, in the second exemplary embodiment, the tank 61 is used in common. The supply pipe 63 extending to the hydrostatic pressure guide mechanism 40 and the supply pipe 66 extending to the sliding guide mechanism 50 are connected to the same tank 61.

According to the second exemplary embodiment, since the respective basic structures of the machine tool 10, the guide mechanism 30, the hydrostatic pressure guide mechanism 40 and the sliding guide mechanism 50 are the same as those in the first exemplary embodiment, the same advantages can be obtained.

Further, in the second exemplary embodiment, the annular groove 411 and the communication groove 414 are omitted. However, supporting of the load by the lubricating oil using the static pressure can be conducted in the same manner as in the first exemplary embodiment by setting the depth of each of the inner part 412 and the outer part 413, thereby effecting the function of the hydrostatic pressure guide mechanism 40.

Further, the structure of the lubricating oil supply device 60 can be simplified by using the same tank 61 for supplying the lubricating oil to the hydrostatic pressure guide mechanism 40 and the sliding guide mechanism 50. Even in the above arrangement, no functional trouble occurs since the same lubricating oil is used in the hydrostatic pressure guide mechanism 40 and the sliding guide mechanism 50.

Third Exemplary Embodiment

Figure 9:
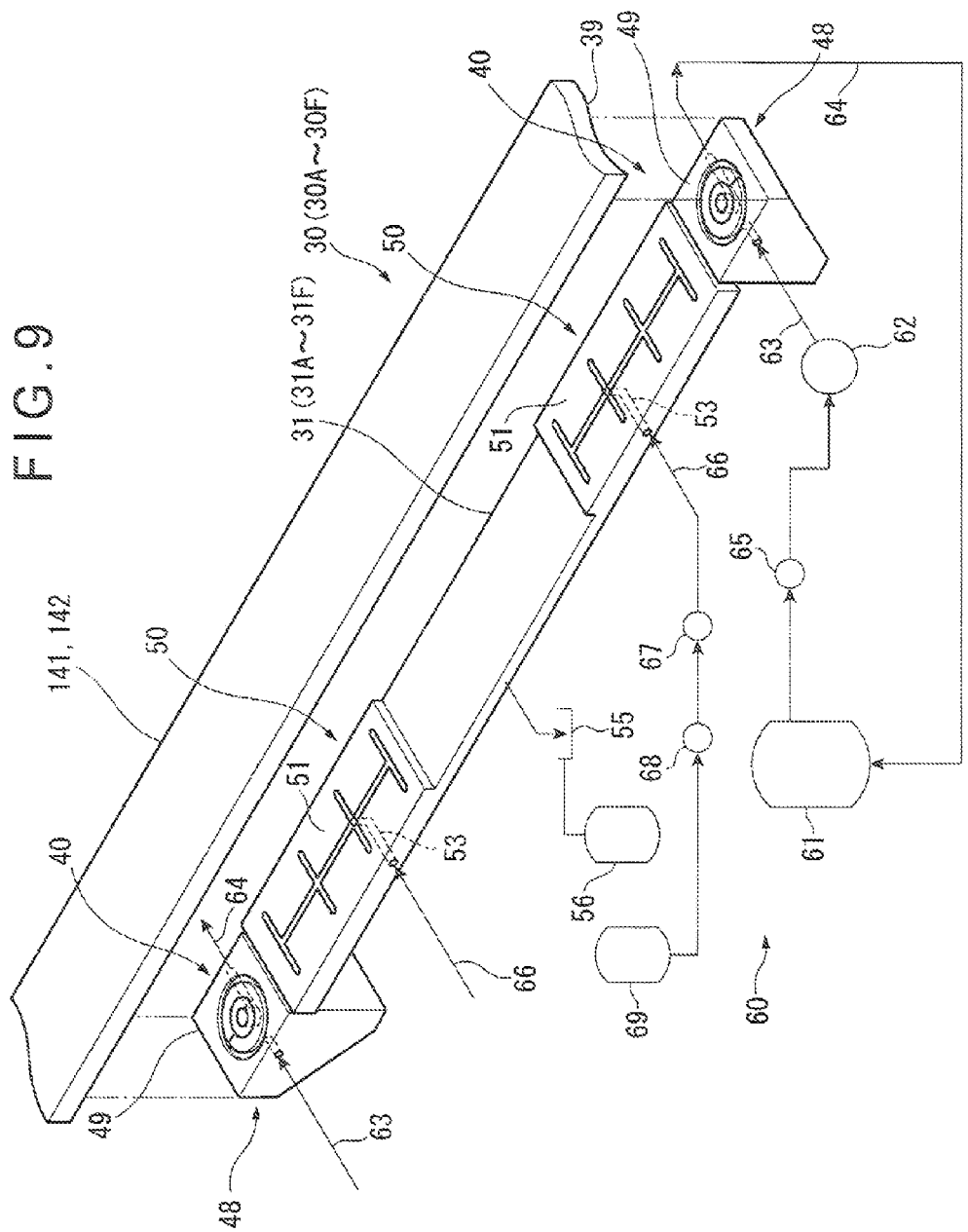
FIG. 9 is an exploded perspective view showing a movement mechanism according to a third exemplary embodiment of the invention.
Figure 10:
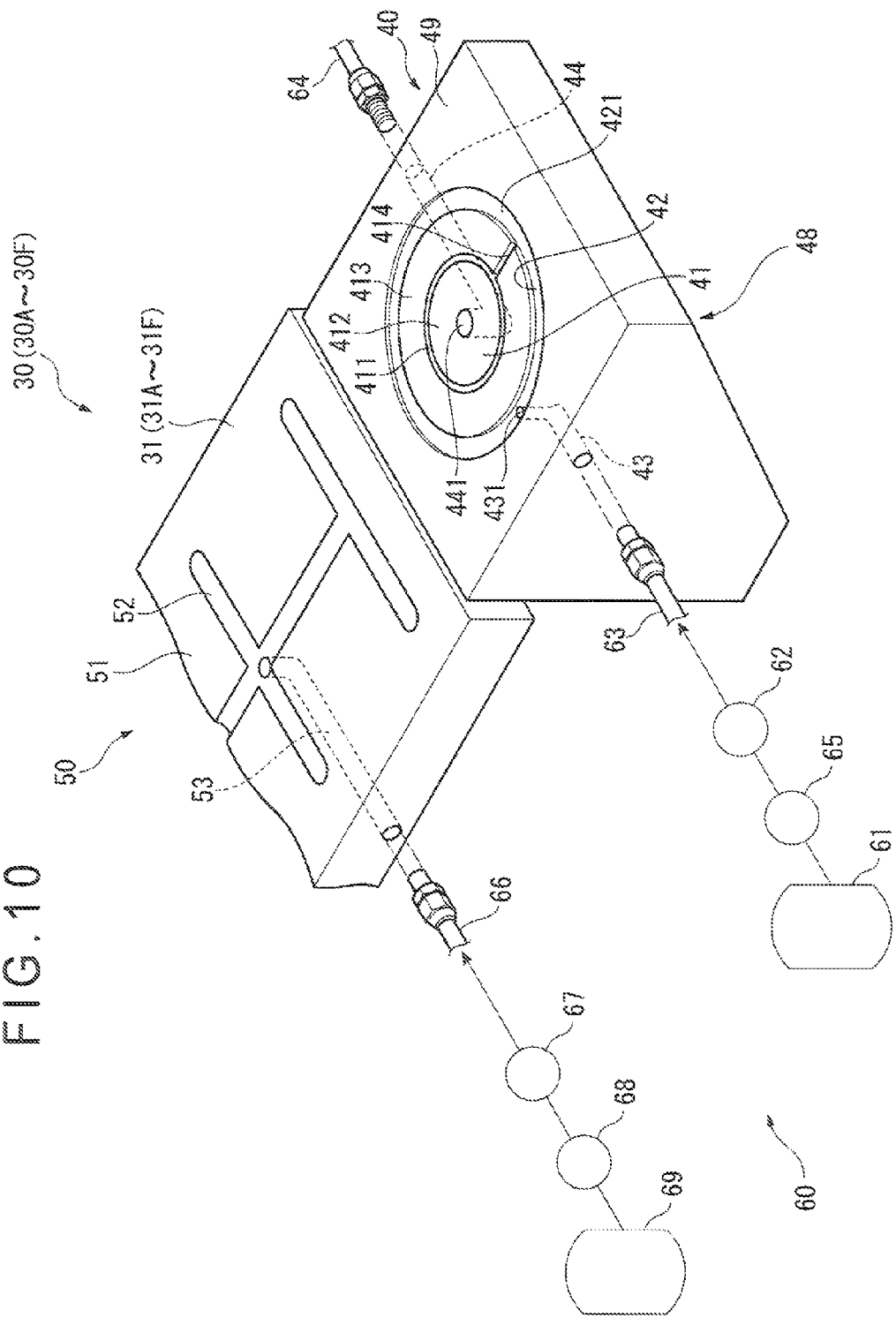
FIG. 10 is a perspective view showing a relevant part of a hydrostatic pressure guide mechanism and a sliding guide mechanism provided to the movement member according to the third exemplary embodiment.

FIGS. 9 to 10 show a third exemplary embodiment of the invention.

In the above first and second exemplary embodiments, the slide surface 51 and the smooth surface 49 are continuously formed on the surface at each end of the movement member 31. The hydrostatic pressure guide mechanism 40 is provided adjacent to the sliding guide mechanism 50.

In contrast, in the third exemplary embodiment, the hydrostatic pressure guide mechanism 40 and the sliding guide mechanism 50 are respectively formed in separate members.

As shown in FIGS. 9 and 10, in the third exemplary embodiment, the sliding guide mechanism 50 is formed in the movement member 31, but the hydrostatic pressure guide mechanism 40 is not formed therein.

However, on each end of the movement member 31, a block-shaped auxiliary movement member 48 is provided. The hydrostatic pressure guide mechanism 40 is formed in the auxiliary movement member 48.

The auxiliary movement member 48 is provided to an outer surface of the spindle head 15 (see FIG. 2) to which the movement member 31 is provided, and is firmly fixed to a frame of the spindle head 15.

The smooth surface 49 of the auxiliary movement member 48 is flush with the slide surface 51 of the movement member 31.

The static pressure chamber 41 and the seal portion 42 are formed on the smooth surface 49 of the auxiliary movement member 48. The supply passage 43 and the recovery passage 44 are formed inside the auxiliary movement member 48.

The same hydrostatic pressure guide mechanism 40 as in the first and second exemplary embodiments is provided by the static pressure chamber 41, the seal portion 42, the supply passage 43 and the recovery passage 44.

According to the third exemplary embodiment, since the sliding guide mechanism 50 formed on the movement member 31 is disposed adjacent to the hydrostatic pressure guide mechanism 40 formed on the auxiliary movement member 48 and both of the hydrostatic pressure guide mechanism 40 and the sliding guide mechanism 50 are guided relative to the guide surface 39 of the first and second rails 141 and 142 (the guide member), the same advantages as those in the first and second exemplary embodiments can be obtained.

Further, in the third exemplary embodiment, the hydrostatic pressure guide mechanism 40 is formed on the auxiliary movement member 48 independent of the movement member 31. Accordingly, the guide mechanism according to the third exemplary embodiment can be easily implemented by additionally providing (so-called retrofitting) the auxiliary movement member 48 having the hydrostatic pressure guide mechanism 40 to an existing machine tool including the movement member 31 in which only the sliding guide mechanism 50 is formed. Thus, the existing machine is usable.

Fourth Exemplary Embodiment

Figure 11:
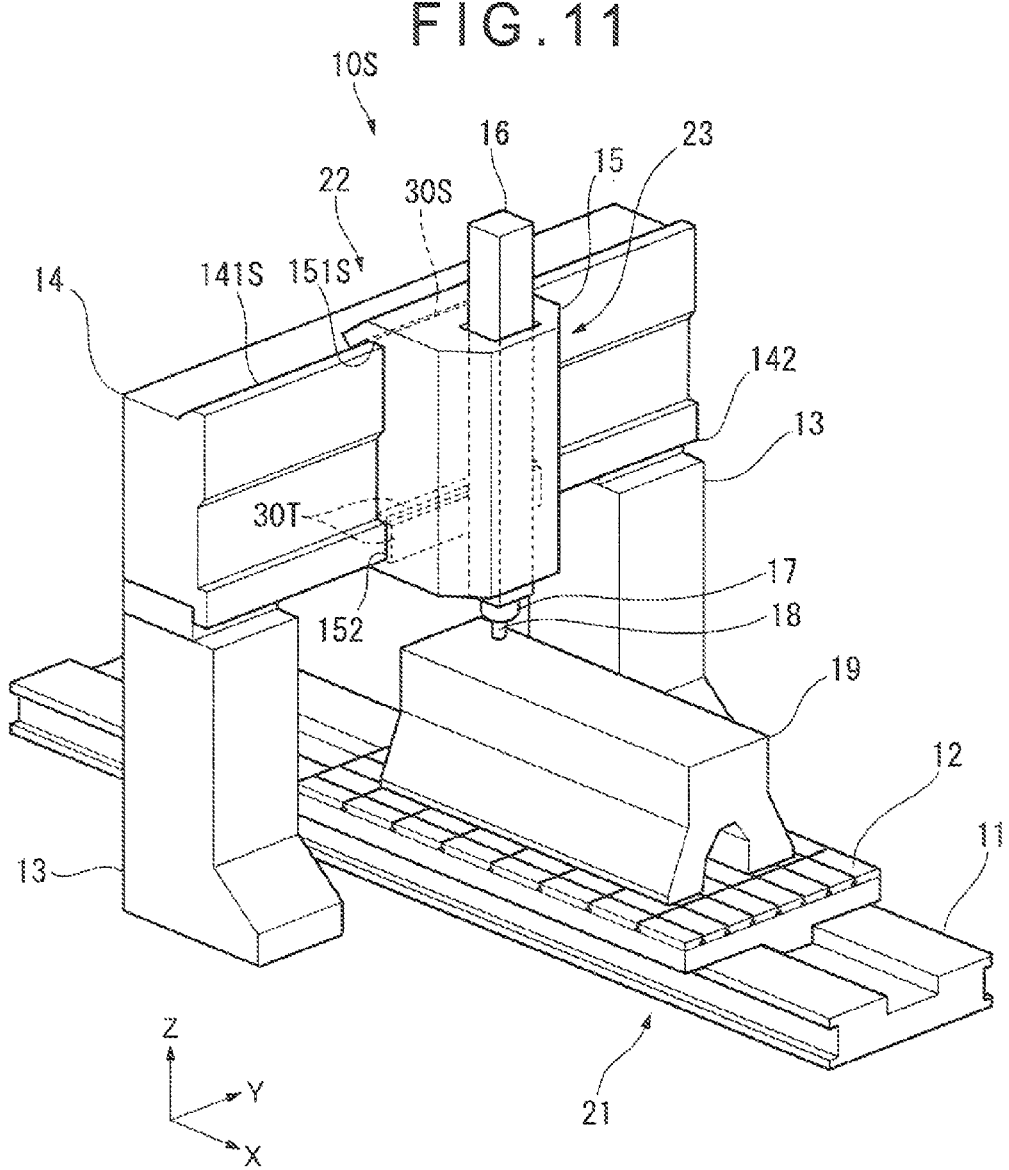
FIG. 11 is a perspective view showing an entire device according to a fourth exemplary embodiment of the invention.
Figure 12:
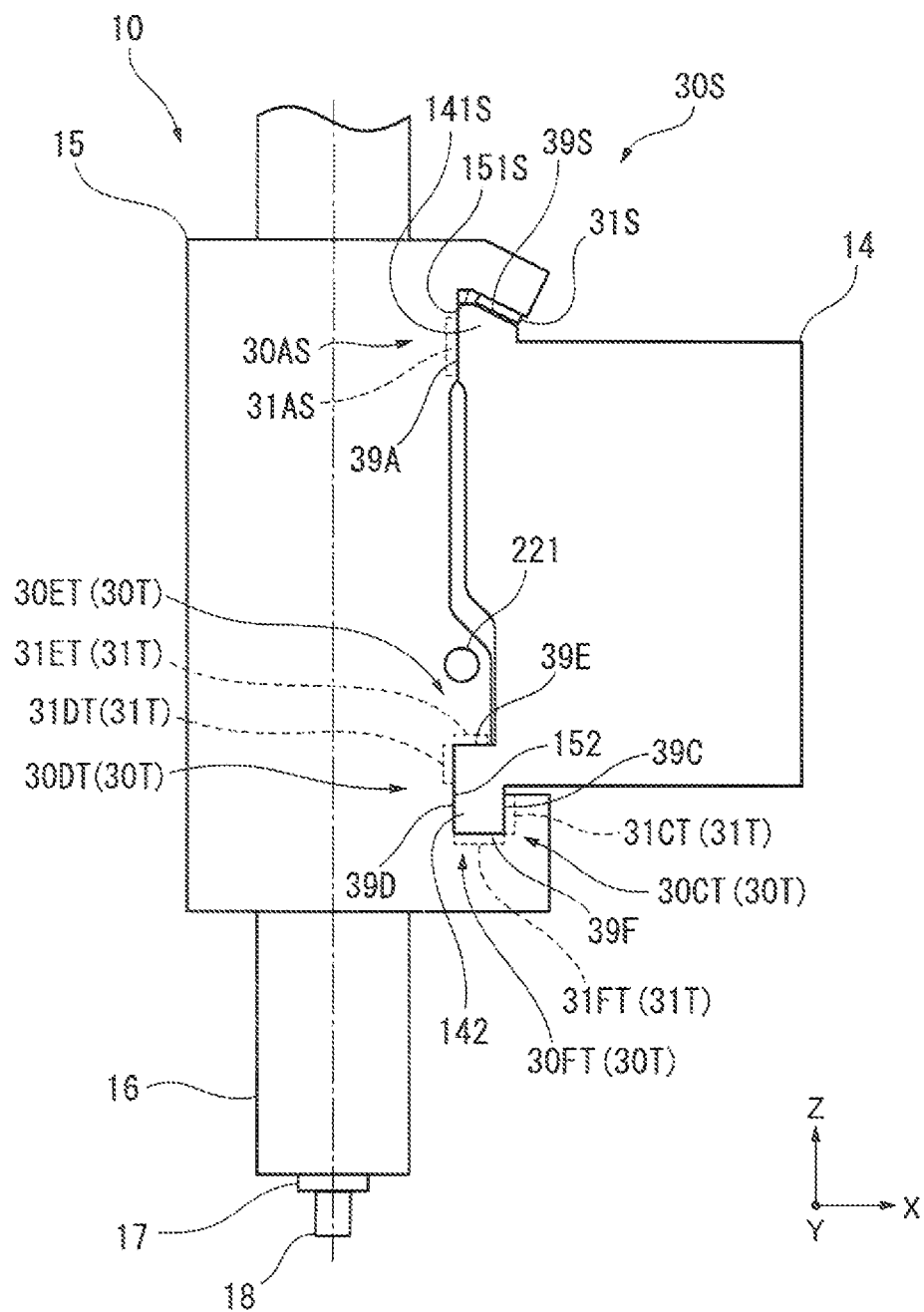
FIG. 12 is a cross-sectional view showing a layout of a movement mechanism according to the fourth exemplary embodiment.

FIGS. 11 to 12 show a fourth exemplary embodiment of the invention.

A shown in FIG. 11, a machine tool 10S of the fourth exemplary embodiment includes a first groove 151S on an upper portion of the spindle head 15, in which the first groove 151S is engaged with a first rail 141S of the cross bar 14, in the same manner as in the machine tool 10 of the first exemplary embodiment (see FIG. 1). Moreover, the machine tool 10S includes a second groove 152 on a lower portion of the spindle head 15, in which the second groove 152 is engaged with the second rail 142 of the cross bar 14.

As shown in FIG. 12, a guide mechanism 30T for supporting the load (guide mechanisms 30CT, 30DT, 30ET, 30FT) is provided between the second groove 152 and the second rail 142.

The guide mechanism 30T for supporting the load (guide mechanisms 30CT, 30DT, 30ET, 30FT) is arranged in the same manner as the guide mechanism 30 (guide mechanisms 30C, 30D, 30E, 30F) in the above first exemplary embodiment.

In the guide mechanism 30 according to the first exemplary embodiment, the guide mechanisms 30C, 30D, 30E and 30F each include the hydrostatic pressure guide mechanism 40 and the sliding guide mechanism 50 on the corresponding movement members 31C, 31D, 31E and 31F.

In contrast, in the guide mechanism 30T according to the fourth exemplary embodiment, the guide mechanisms 30CT, 30DT, 30ET and 30FT each include only the sliding guide mechanism 50 on the corresponding movement members 31CT, 31DT, 31ET and 31FT.

In other words, in the fourth exemplary embodiment, the hydrostatic pressure guide mechanism 40 is not used for the guide mechanism 30T for supporting the load.

The movement members 31CT, 31DT, 31ET and 31FT only including the sliding guide mechanism 50 are only required to have the same arrangement as that of the movement member 31 in the third exemplary embodiment (see FIG. 9).

A guide mechanism 30S for preventing the spindle head 15 from tilting is provided between the first groove 151S and the first rail 141S.

The first rail 141S has an inclined guide surface 39S. A movement member 31S is provided inside the first groove 151S so as to face the guide surface 39S. The guide mechanism 30S is formed by the guide surface 39S and the movement member 31S.

In the fourth exemplary embodiment, the guide mechanism 30S only has the hydrostatic pressure guide mechanism 40 on the movement member 31S.

A guide mechanism 30AS accompanying the guide mechanism 30S is formed between the spindle head 15 and the first rail 141S. The guide mechanism 30AS is arranged in the same manner as the guide mechanism 30A in the first exemplary embodiment, in which the guide mechanism 30AS includes a vertical guide surface 39A and a movement member 31AS slidable on the guide surface 39A.

Although the guide mechanism 30A according to the first exemplary embodiment includes the hydrostatic pressure guide mechanism 40 and the sliding guide mechanism 50 on the movement member 31A, the guide mechanism 30AS according to the fourth exemplary embodiment includes only the sliding guide mechanism 50 on the movement member 31AS.

With this arrangement, the weight of the spindle head 15 can be supported by the cross bar 14 using the guide mechanism 30T at the lower portion of the spindle head 15. Moreover, since the guide mechanism 30S is formed inclined on the upper portion of the spindle head 15, the guide mechanism 30S can receive tilt moment by the weight of the spindle head 15, so that the spindle head 15 can be prevented from tilting.

In this arrangement, since the guide mechanism 30S for tilt prevention is provided by the hydrostatic pressure guide mechanism 40 formed between the guide surface 39S and the movement member 31S, a high load capacity can be provided. On the other hand, since the sliding guide mechanism 50 is used for the guide mechanism 30T and the guide mechanism 30AS, a typical mechanism is usable.

The movement member 31S having only the hydrostatic pressure guide mechanism 40 to be used for the guide mechanism 30S for tilt prevention can be arranged as follows.

Figure 13:
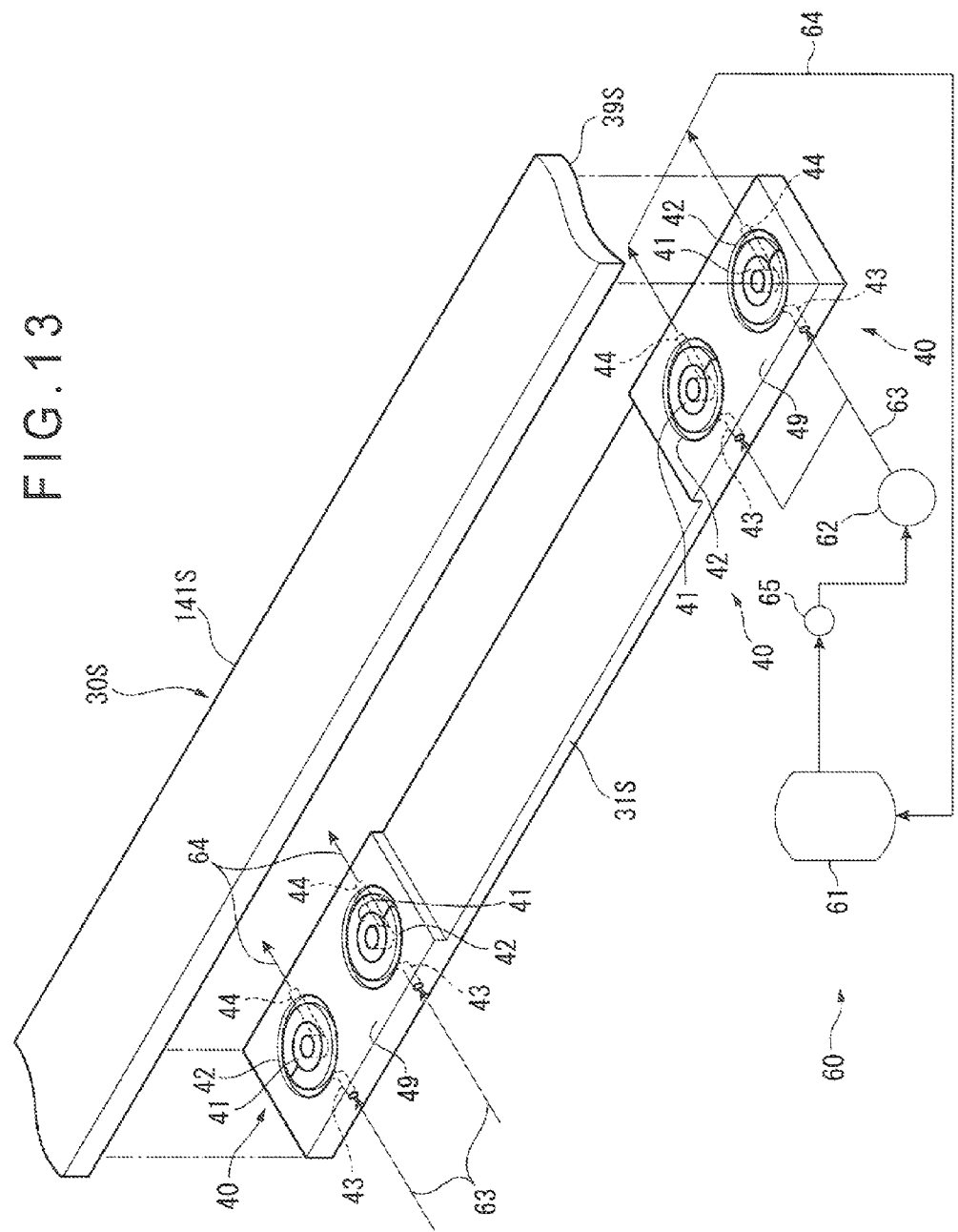
FIG. 13 is an exploded perspective view showing a modification of the movement mechanism according to the fourth exemplary embodiment.

In FIG. 13, a surface of each of the thick stepped portions on both ends of the movement member 31S is defined as the smooth surface 49. Two hydrostatic pressure guide mechanisms 40 are formed on the smooth surface 49.

The arrangement of the hydrostatic pressure guide mechanism 40 is the same as that in the first exemplary embodiment. Duplicated description will be omitted.

In the above guide mechanism 30S, the movement member 31S includes four hydrostatic pressure guide mechanisms 40 in total, whereby a large load can be received between the guide mechanism 30S and the first rail 141S (the guide member).

Other Exemplary Embodiment

It should be understood that the scope of the invention is not limited to the above-described exemplary embodiments but includes modifications and improvements as long as the modifications and improvements are compatible with an object of the invention.

For instance, the number, layout, size and the like of the hydrostatic pressure guide mechanism 40 to be provided to each component can be determined as desired when the invention is implemented. For instance, a plurality of hydrostatic pressure guide mechanisms 40 may be juxtaposed relative to a single guide mechanism 30.

In the fourth exemplary embodiment, the guide mechanism 30S (movement member 31S) for tilt prevention includes only the hydrostatic pressure guide mechanism 40 and the guide mechanism 30T and guide mechanism 30AS for supporting load includes only the sliding guide mechanism 50. However, a combination of the hydrostatic pressure guide mechanism 40 and the sliding guide mechanism 50 may be used in each of the guide mechanisms.

In the above exemplary embodiments, the lubricating oil supply device 60 includes the passage for supplying and recovering the lubricating oil to and from the hydrostatic pressure guide mechanism 40, and in addition, includes the passage for supplying the lubricating oil to the sliding guide mechanism 50.

However, when it is not necessary to supply the lubricating oil to the sliding guide mechanism 50, the function of supplying the lubricating oil to the sliding guide mechanism 50 may be omitted. For instance, when the amount of the lubricating oil overflowing from the hydrostatic pressure guide mechanism 40 is equal to the amount of the lubricating oil required in the sliding guide mechanism 50, the lubricating oil may be flowed from a part of the seal portion 42 of the hydrostatic pressure guide mechanism 40 to be supplied to the sliding guide mechanism 50.

The sliding guide mechanism 50 is not limited to the sliding guide mechanism in which the same lubricating oil as in the hydrostatic pressure guide mechanism 40 is used for lubrication and wear prevention. A sliding guide mechanism using other oil and fat or using a solid lubricating material as the slide surface 51 may be employed. In such an arrangement, since the seal portion 42 can prevent the lubricating oil from leaking from the hydrostatic pressure guide mechanism 40, the sliding guide mechanism 50 is not adversely affected by leakage of the lubricating oil.

In the above exemplary embodiments, the guide surface 39 is provided to each of the first and second rails 141 and 142 (the guide member) and the guide surface 39 is used in common between the hydrostatic pressure guide mechanism 40 and the sliding guide mechanism 50 of the movement member 31. However, the common use of the guide surface 39 is not a requisite. Two rows of the guide surfaces 39 may be provided on the guide member, in which the respective guide surfaces 39 may be used for the hydrostatic pressure guide mechanism 40 and the sliding guide mechanism 50.

Alternatively, it is not a requisite to collectively provide the hydrostatic pressure guide mechanism 40 and the sliding guide mechanism 50 on the movement member 31. For instance, the hydrostatic pressure guide mechanism 40 and the guide surface (for slide guide) may be provided on the movement member 31 while the sliding guide mechanism 50 and the guide surface (for hydrostatic pressure guide) may be provided on the guide member (the first and second rails 141 and 142 in the above exemplary embodiments).

In the hydrostatic pressure guide mechanism 40 according to the above exemplary embodiments, a circulation type hydrostatic structure is employed in which the lubricating oil is supplied from the supply passage 43 to the static pressure chamber 41, the lubricating oil discharged from the static pressure chamber 41 is recovered from the recovery passage 44, and the recovered lubricating oil is returned to the tank 61. However, the structure of the hydrostatic pressure guide mechanism 40 is not limited to a circulation type hydrostatic structure, but may be a simple flow type hydrostatic structure. For instance, without returning the recovered lubricating oil from the recovery passage 44 to the tank 61, the lubricating oil may be supplied from the supply passage 43 to the static pressure chamber 41 to generate static pressure in the static pressure chamber 41, and subsequently the lubricating oil may be recovered only by the recovery passage 44.

Further, the structure of the hydrostatic pressure guide mechanism 40 may be an encapsulation type hydrostatic structure in which the static pressure of the lubricating oil stored in the static pressure chamber 41 is used. Also in this arrangement, the supply passage 43 needs to be provided in order to maintain the amount and the pressure of the lubricating oil in the static pressure chamber 41 at respective predetermine values. However, the recovery passage 44 can be omitted.

The above exemplary embodiments relate to an instance where the guide mechanism of the invention is applied to the Y-axis movement mechanism 22 for relatively moving the cross bar 14 and the head 15 in the machine tool 10 having a portal supporting structure including a pair of columns 13 and the cross bar 14. However, the guide mechanism of the invention is not limited to application to such components, but may be applied to other relatively movable portions of the machine tool 10, for instance, the guide mechanism of the Z-axis movement mechanism 23 that relatively moves the head 15 and the ram 16 or the guide mechanism of the X-axis movement mechanism 21 that relatively moves the platform 11 and the table 12.

In FIG. 1 above, a pair of guide mechanisms capable of mainly receiving the load of the table 12 are provided as the X-axis movement mechanism 21 on an upper surface of the platform 11. A guide mechanism capable of restricting the moving direction of the table 12 relative to the platform 11 may be provided on a vertical inner wall of a recess between the guide mechanisms.

Figure 14:
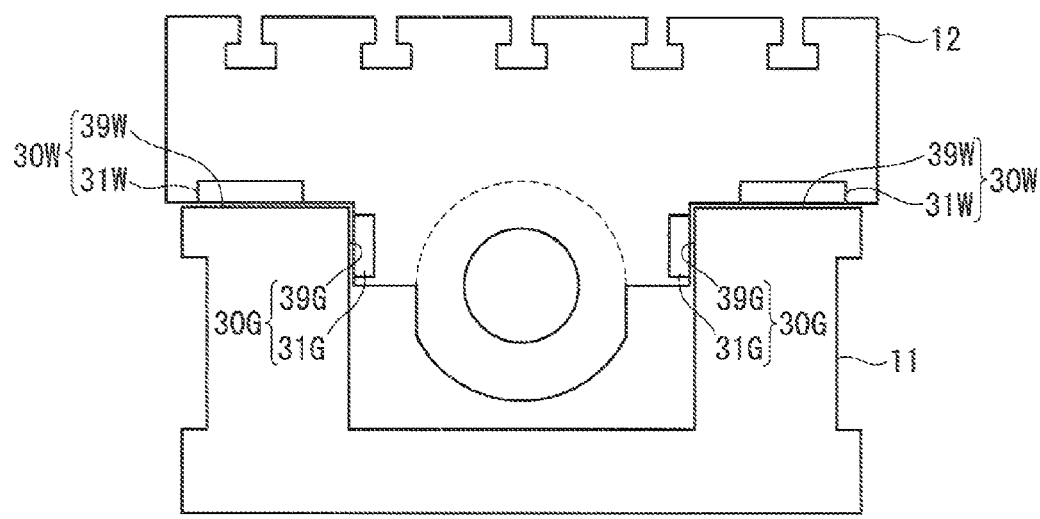
FIG. 14 is a cross-sectional view showing another exemplary embodiment of the invention.

As shown in FIG. 14, a guide mechanism 30W for supporting load includes a guide member 31W on a lower surface of the table 12. An upper surface of the platform 11 is the guide surface 39W against the guide member 31W. A guide mechanism 30G for restricting the moving direction includes a pair of guide members 31G on both sides of a recess formed on the lower surface of the table 12. A pair of inner surfaces of a groove formed in the platform 11 are the guide surfaces 39G against the guide members 31G.

Among the above arrangements, since the load received by the guide mechanism 30W for supporting the load is substantially the weight of the table 12 and the weight of the workpiece 19 (see FIG. 1), the sliding guide mechanism 50 is usable.

On the other hand, the guide mechanism 30G for restricting the moving direction occasionally receives in a horizontal direction a cutting force much larger than the above weights of the table 12 and the workpiece 19, in which the force exceeds an allowable surface pressure of the sliding guide mechanism 50. For this reason, the guide mechanism 30G for restricting the moving direction can receive a high load using the hydrostatic pressure guide mechanism 40.

Thus, the hydrostatic pressure guide mechanism 40 and the sliding guide mechanism 50 may be selectively used depending on requisite conditions of the guide mechanism for each of the components (e.g., the guide mechanism 30W for supporting the load and the guide mechanism 30G for restricting the moving direction).

Further, the guide mechanism of the invention may be applied not only to the guide mechanism for linear movement but also to the guide mechanism at a rotary portion (e.g., a rotary support mechanism of a rotary table).

The machine tool to which the guide mechanism of the invention is applied is not limited to the machine tool 10 but is applicable to various machine tools having two relatively movable members.

What is claimed is:

1. A guide mechanism for a machine tool, comprising:
a first member and a second member relatively movable to each other; and
a hydrostatic pressure guide mechanism and a sliding guide mechanism formed between the first and second members, wherein
the hydrostatic pressure guide mechanism comprises: a smooth guide surface formed on the first member; a static pressure chamber formed on the second member to face the guide surface; a seal portion surrounding the static pressure chamber; and a supply passage configured to supply a lubricating oil into the static pressure chamber; and
the sliding guide mechanism comprises: the smooth guide surface formed on the first member; a slide surface formed on the second member to face and slidingly contact the guide surface; and an oil supply groove formed on the slide surface.

2. The guide mechanism for a machine tool according to claim 1, wherein
the hydrostatic pressure guide mechanism comprises a recovery passage configured to recover the lubricating oil from the static pressure chamber.

3. The guide mechanism for a machine tool according to claim 2, wherein
the supply passage supplies the lubricating oil to near the periphery of the static pressure chamber, and
the recovery passage recovers the lubricating oil from a center of the static pressure chamber.

4. The guide mechanism for a machine tool according to claim 1, wherein
the first member is a guide member and the second member is a movement member relatively movable along the guide member,
the guide member comprises a smooth guide surface, and
the hydrostatic pressure guide mechanism and the sliding guide mechanism are formed between the movement member and the guide surface and use the guide surface in common.

5. The guide mechanism for a machine tool according to claim 4, wherein
the movement member comprises: the static pressure chamber facing the guide surface; and the seal portion surrounding the static pressure chamber, and
the static pressure chamber and the guide surface define the hydrostatic pressure guide mechanism.

6. The guide mechanism for a machine tool according to claim 4, wherein
the movement member comprises: the slide surface facing the guide surface; and the oil supply groove formed on the slide surface, and
the slide surface and the guide surface define the sliding guide mechanism.

7. The guide mechanism for a machine tool according to claim 1, wherein
the sliding guide mechanism is provided inside the machine tool and the hydrostatic pressure guide mechanism is fixed to each end of the sliding guide mechanism.

8. A machine tool comprising the guide mechanism for a machine tool according to claim 1.

9. The machine tool according to claim 8, further comprising:
a fixed member;
a movement member configured to move in a horizontal direction relative to the fixed member; and
a guide mechanism for supporting a load extending in the horizontal direction and a guide mechanism for tilt prevention configured to resist inclination relative to the guide mechanism for supporting the load, the guide mechanisms being provided between the fixed member and the movable member.

* * * * *